US012808353B2

(12) United States Patent
Frigstad

(10) Patent No.: US 12,808,353 B2
(45) Date of Patent: Nov. 24, 2026

(54) DEVICE AND A METHOD FOR FACILITATING ASSEMBLING OF A WIND TURBINE

(71) Applicant: Frigstad Engineering (Norway) AS, Kristiansand (NO)

(72) Inventor: Harald Frigstad, Kristiansand (NO)

(73) Assignee: FRIGSTAD ENGINEERING (NORWAY) AS, Kristiansand (NO)

( * ) Notice: Subject to any disclaimer, the term of this patent is extended or adjusted under 35 U.S.C. 154(b) by 0 days.

(21) Appl. No.: 18/852,818

(22) PCT Filed: Mar. 9, 2023

(86) PCT No.: PCT/NO2023/050053
§ 371 (c)(1),
(2) Date: Sep. 30, 2024

(87) PCT Pub. No.: WO2023/195857
PCT Pub. Date: Oct. 12, 2023

(65) Prior Publication Data

US 2025/0223945 A1 Jul. 10, 2025

(30) Foreign Application Priority Data

Apr. 8, 2022 (NO) .................................. 20220427

(51) Int. Cl.
*F03D 13/10* (2016.01)
*B63B 35/44* (2006.01)
(Continued)

(52) U.S. Cl.
CPC ............ *F03D 13/112* (2023.08); *B63B 35/44* (2013.01); *B63B 75/00* (2020.01); *B66C 1/108* (2013.01);
(Continued)

(58) Field of Classification Search
CPC .... F03D 13/112; F03D 13/104; F03D 13/126; F03D 13/139; F03D 13/10; F03D 13/40;
(Continued)

(56) References Cited

U.S. PATENT DOCUMENTS 11,560,875 B2 * 1/2023 Giles ...................... B66C 1/108
2010/0293781 A1 11/2010 Foo
(Continued)

FOREIGN PATENT DOCUMENTS

EP 2275340 A2 1/2011
EP 2597027 A1 5/2013
(Continued)

OTHER PUBLICATIONS

Norwegian Search Report for Corresponding Norwegian Application No. 20220427, dated Jan. 11, 2022.
(Continued)

*Primary Examiner* — Moshe Wilensky
(74) *Attorney, Agent, or Firm* — Andrus Intellectual Property Law, LLP

(57) ABSTRACT

A device and a method are for assembling a wind turbine. The device has an assembling structure including a space for assembling a tower and a nacelle of a wind turbine, the space being defined by side portions of the assembling structure, and a hoisting device configured for handling the wind turbine tower and for hoisting the nacelle onto a top of the wind turbine tower while being positioned within said space, the hoisting device being movably connected to a hoisting device support structure arranged on top of the assembling structure. The device further includes a support arrangement for supporting a portion of the wind turbine at least when being within said space and a rotor blade manipulator for bringing rotor blades in contact with the nacelle.

19 Claims, 19 Drawing Sheets

(51) Int. Cl.

| | |
|---|---|
| ***B63B 75/00*** | (2020.01) |
| ***B66C 1/10*** | (2006.01) |
| ***B66C 23/18*** | (2006.01) |
| ***B66C 23/52*** | (2006.01) |

(52) U.S. Cl.
CPC ............ *B66C 23/185* (2013.01); *B66C 23/52* (2013.01); *F03D 13/104* (2023.08); *B63B 2035/446* (2013.01); *F05B 2230/61* (2013.01)

(58) Field of Classification Search
CPC ....... B63B 35/44; B63B 35/003; B63B 75/00; B63B 2035/446; B63B 27/30; B66C 1/108
See application file for complete search history.

(56) References Cited

U.S. PATENT DOCUMENTS

| | | | |
|---|---|---|---|
| 2011/0056168 | A1 | 3/2011 | Springett |
| 2021/0246878 | A1 | 8/2021 | Van Hintum |
| 2022/0010777 | A1 | 1/2022 | Giles |

FOREIGN PATENT DOCUMENTS

| | | | |
|---|---|---|---|
| EP | 2641825 | A1 | 9/2013 |
| EP | 3683182 | A1 | 7/2020 |
| EP | 3922844 | A1 | 12/2021 |
| JP | 2017014940 | A | 1/2017 |
| JP | 2021080852 | A | 5/2021 |
| KR | 20170107628 | A | 9/2017 |
| KR | 20170107629 | A | 9/2017 |
| WO | 2012039889 | A1 | 3/2012 |
| WO | 2012060112 | A1 | 5/2012 |
| WO | 2015003733 | A1 | 1/2015 |
| WO | 2021212173 | A1 | 10/2021 |
| WO | 2022038165 | A1 | 2/2022 |

OTHER PUBLICATIONS

International Search Report and Written Opinion for Corresponding International Application No. PCT/NO2023/050053, dated Apr. 21, 2023.
Extended European Search Report for EP Application No. 23804882.1, dated Jan. 23, 2025.
Notice of Reasons for Refusal in JP Application No. 2024-559704, dated Sep. 1, 2026.

* cited by examiner

DEVICE AND A METHOD FOR FACILITATING ASSEMBLING OF A WIND TURBINE

CROSS-REFERENCE TO RELATED APPLICATIONS

This application is the U.S. national stage application of International Application No. PCT/NO2023/050053, filed Mar. 9, 2023, which international application was published on Oct. 12, 2023, as WO 2023/195857 in the English language. The International Application claims priority to Norwegian Patent Application No. 20220427, filed Apr. 8, 2022. The international application and Norwegian application are both incorporated herein by reference, in their entirety.

FIELD

The present invention is related to assembling of a wind turbine. More specifically, the invention is related to a device and a method for facilitating assembling of a wind turbine, wherein the device comprising a base extending in an x-y direction, and an assembling structure extending upward in a z-direction from said base.

BACKGROUND

Bottom-fixed offshore wind turbines are today mostly installed in two separate operations.

A first operation is instalment of seabed supported foundations, which in most cases are either monopiles or steel jackets. An installation of monopiles is typically executed by means of a floating pile driving rig configured to drive the monopiles into the ground. An installation of a steel jacket is typically executed by means of a lifting vessel having a high lifting capacity.

A second operation is installation of the wind turbine tower, nacelle, and rotor blades onto the bottom supported foundation. This work is normally performed by using a barge or jack up type installation vessels which are jacked up and out of the water, with legs abutting against the seabed during the installation process. The main components of a wind turbine, i.a. wind turbine tower, nacelle, and blades, are typically lifted onto the foundation in pieces—one by one. Such jack up type installation vessels are configured for operation in a relatively calm sea and thus depends on suitable weather window, as the jacking up/down operation can normally only be performed with wave heights below a certain level, typically 2-3 meters Hs. Furthermore, the existing jack up wind turbine installation vessels have both wind force and water depth limitations and are typically only able to operate in up to 60-70 meters of water depth.

However, there is a drive in the market to install larger bottom fixed wind turbines in deeper water wherein the wind turbine would need to be installed by a floating vessel.

In waters where bottom fixed foundations may not practical, offshore wind turbines can be installed on a floating foundation. A wind turbine may be installed on a floating foundation by means of a floating wind turbine installation vessel provided with heavy lift cranes. Assembling and installation of offshore wind turbines from a floating vessel has been challenging, as the assembly of wind turbine components and the installation of the wind turbine onto a foundation are highly sensitive to vessel movements caused by waves, as well as component movements resulting from wind force.

Alternatively, an installation of a floating wind turbine may comprise assembling of the wind turbine onshore, for example at a shipyard or a quay, wherein the wind turbine is connected to the floating foundation at the yard and then towed to the desired location of operation. However, a desired location of operation may be far from the shipyard or quay, and a towing operation is dependent on a suitable weather window.

Further, although ocean waves may not be an issue at a shipyard or a quay located in sheltered water, an assembly of the wind turbine itself and the installation of the wind turbine onto a floating foundation at the shipyard or quay still depends on a suitable weather window because such an installation by cranes requires that a wind does not exceed a predetermined velocity.

Publication US 2021/0246878 A1 discloses an installation vessel configured for offshore installation of wind turbines at a target location while floating, the vessel comprising: a nacelle support structure for temporarily supporting a nacelle comprising a hub having a plurality of root end connectors to which the root ends of the blades are to be connected, the nacelle support structure comprising: a support tower extending upwardly from a deck of the installation vessel, a support platform connected to the support tower, the support platform being configured to temporarily support the nacelle during the connecting of one or more blades thereto, one or more lifting devices configured for: lifting the nacelle onto the support platform, lifting a completed nacelle assembly onto a wind turbine mast located adjacent the vessel, wherein the lifting device for lifting the completed nacelle assembly is a crane which is separate from the support tower.

Thus, US 2021/0246878 is based on lifting the tower and the rotor/nacelle assembly (RNA) onto the foundation in two separate operations which are sensitive to vessel movement and wind.

Publication EP2275340 B1 discloses an installation vessel for offshore installation of a wind turbine, the installation vessel comprising: a deck; a main crane; and a cantilever mast mounted on the deck, the cantilever mast including: a cantilever structure movably mounted on the deck; a mast mounted on the cantilever structure, the mast including a lifting structure operable to secure to a wind turbine component, a first guide, and an intermediate platform at an intermediate height along the mast; wherein the main crane is operable to transfer a tower section from the installation vessel to an offshore installation site spaced apart from the installation vessel and, at the same time, the intermediate platform is operable to support a nacelle and a hub to enable blade installation to be performed thereon to form a nacelle and rotor assembly; and wherein the cantilever mast is further operable to transfer the nacelle and rotor assembly between the installation vessel and the offshore installation site by, while movably engaging the lifting structure to the mast using the first guide throughout a lifting operation to prevent swinging of the nacelle and rotor assembly, moving the cantilever mast in a longitudinal direction and a transverse direction.

There is also known a floating windfarm installation vessel provided by the company Huisman. The installation vessel is configured for installing a complete wind turbine including foundation. In operation, the wind turbine tower, nacelle, and blades are assembled onboard the vessel by means of a rotating crane tower provided with gripping arms. The assembled wind turbine is then lifted onto the wind turbine foundation in one operation. The rotating crane tower is configured for simultaneous operations, such as upending of foundation or tower on one side of the vessel, while installing foundation or upper part of wind turbine on the other side of the vessel. The gripping arms secures the assembly with respect to the crane tower and is thus less vulnerable to ocean waves and heavy wind than vessels provided with ordinary cranes. However, one disadvantage with a rotating crane tower is that the various operations must be coordinated. Further disadvantages are that when rotating the crane tower while items being gripped by the gripping arms, a free space is required on an outside of a perimeter of the tower, and that a rotating tower is a relatively complicated and expensive structure. Still further, prior to assembling the wind turbine, the towers and any foundations are stored horizontally on the deck of the floating vessel, thereby requiring a large space distant from the operating space of the crane.

Publication EP3683182 A1 discloses a multi-functional clamp for the installation of a wind turbine on an offshore substructure by means of a crane vessel equipped with a lifting crane, the multi-functional clamp having a main body configured to selectively clamp and unclamp the lower part of the tower of a wind turbine and is shaped so as to couple with the crane vessel so as to define a given position for the tower with respect to the crane vessel, and a plurality of hooking members extending from the main body and configured to secure and release the free ends of a rigging assembly of the lifting crane to the main body so as to lift the multi-functional clamp by means of the lifting crane.

Publication WO 2021212173 A1 discloses a self-propelled floating structure.

Publications KR20170107628 A and KR20170107629 A disclose an offshore structure installation ship and equipment.

There is a need in the market of wind turbine installation for a device that can be used both onshore, such as for example at a shipyard or quay, or offshore such as for example floating vessel, wherein various operations can be executed independently of each other in a safe manner, while at the same time being substantially independent of weather conditions such as wind for a device installed onshore, and of ocean waves and wind for a device installed on a floating vessel.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect the invention there is provided a device for facilitating assembling of a wind turbine, the device comprising:

- a base extending in an x-y direction, and an assembling structure extending upward in a z-direction from said base. The assembling structure comprises;
- a space for assembling a tower and a nacelle of a wind turbine, the space being defined by side portions of the assembling structure,
- tower passages for passing an upright wind turbine tower and nacelle into and out from said space, and a nacelle passage for passing a nacelle into said space,
- a hoisting device configured for handling the wind turbine tower and for hoisting the nacelle onto a top of the wind turbine tower while being positioned within said space, the hoisting device being movably connected to a hoisting device support structure provided with protrusions for allowing the hoisting device to operate through said passages.

The device further comprises:

- a support arrangement for supporting a portion of the wind turbine at least when being within said space; and
- a rotor blade manipulator operatively connected to a portion of the assembling structure, the manipulator being configured for bringing a root of a rotor blade in contact with a hub of the nacelle.

The assembling structure has the function of being both a crane tower, and for providing a rigid base for handling equipment such as said rotor blade manipulator and parts of the support arrangement. By providing a rigid base for the handling equipment and parts of the support arrangement, any movement of the assembling structure will result in said handling equipment moving in tandem with the assembling structure.

The tower of the wind turbine may be provided in sections, for example two or three sections. In such a situation, the portions of the wind turbine tower may be assembled in an upright position within the space of the assembling structure.

In a preferred embodiment the support arrangement comprises a carriage movable along a track, wherein the carriage is configured for guiding and supporting a lower end portion of the wind turbine tower. Thus, the lower end portion of the wind turbine tower may be guided along a defined moving path for the wind turbine tower within the space, thereby preventing any uncontrolled movement of the lower end portion of the wind turbine tower.

The carriage may comprise a plurality of carriages movably arranged on the track. This has the effect that for example a first carriage may be utilized for bringing the wind turbine tower into the space of the assembling structure, while at least a second carriage may be utilized for moving the wind turbine tower to certain locations within the space, and even to a temporary storage area within or on an outside of said space, as will be explained below.

When bringing the wind turbine tower from one carriage to another carriage by raising the wind turbine tower by means of the hoisting device, the guiding of the lower end portion of the wind turbine tower will cease. To prevent uncontrolled movement of the wind turbine tower during such an operation, it is an advantage if the support arrangement further comprising gripping means for engaging a portion of a wind turbine tower, wherein the gripping means being operatively connected to the assembling structure. Thereby, the carriage, and the gripping means being operatively connected to the assembling structure, provides a "grip-to-grip" safe handling of the wind turbine tower. A grip-to-grip handling of the wind turbine tower prevents any uncontrolled movement of the wind turbine tower being subject to wind (onshore) and wind and ocean waves for a floating vessel.

The gripping means may be provided at certain locations. However, it is an advantage if the gripping means comprises at least one gripping means that are movably connected to the assembling structure via a guideway. A gripping means being movably connected to the assembling structure via a guideway may allow for moving the wind turbine tower along to for example a stationary gripping means, even when the wind turbine tower is disconnected from the movable hoisting device, which may otherwise be used for moving the wind turbine tower within the space of the assembling structure. Such a movable gripping device may be operatively connected to a driving device. The gripping devices themself, independently of being stationary or movable, are operatively connected to actuators of a type known per se, such as for example electrically operated actuators or fluid operated actuators. Preferably, such actuators are configured for remote operation so that personnel do not have to enter the space for controlling the operation. A safe operation is thereby achieved.

When moving the wind turbine tower along the track within the space to a nacelle assembling position, a top portion of the wind turbine tower is preferably connected to the hoisting device. However, a hoisting device connected to a top portion of the wind turbine tower, must be disconnected prior to bringing a nacelle onto a top portion of the wind turbine tower (after disconnecting a hoisting connection). To prevent any movement of the wind turbine tower during assembly of the nacelle, the support arrangement may further comprise a receptacle extending downwardly from an aperture in the base. Such a receptacle is adapted to receive and provide support in a x-y-z direction of a lower portion of the wind turbine tower. The receptacle may for example extend 5-8 meters from a top of the base of the device. The wind turbine tower is lowered into and brought out of the receptacle by means of the hosting device.

The hoisting device may comprise an upper skid movably connected to a first skid support forming part of the hoisting device support structure, the upper skid movable in a first direction in a plane being parallel to the base; a lower skid moveably connected to a second skid support forming part of the upper skid, the lower skid movable in a second direction in a plane being parallel to the base, the second direction being transverse to said first direction; and a winch apparatus operatively connected to the lower skid. Thereby, the winch apparatus is movable in an x-y direction with respect to the hoisting support structure. A winch apparatus movable in an x-y direction makes possible a track of the support arrangement extending in an x-y direction. Thus, the passages into and out of the space of the assembling structure may be perpendicular to each other.

The winch apparatus may comprise a spreader provided with arms for releasably connecting to a gripper configured for gripping a portion of the wind turbine tower, and connectors for connecting to the nacelle. The gripper may comprise a clamp for gripping around a portion of the wind turbine tower. Preferably, the spreader is configured so that the arms straddle opposite side portions of the nacelle to facilitate engagement with the tower clamp. Preferably, when the arms are operatively connected to the tower clamp, the arms are configured to carry at least the weight of the assembly of the nacelle and the tower of the wind turbine. Carrying the assembly of the nacelle and the tower by means of the arms connected to the spreader, a total weight of the assembly is carried independently of the nacelle. Thus, the lifting devices on top of the nacelle may be designed independently of a weight of the tower.

In a position of use, the clamp is configured for abutting against a protrusion forming part of the tower. The protrusion may for example be a flange forming part of a portion of a section of a tower section, or forming part of a connector for being secured to a portion of the wind turbine tower, preferably at a top portion of the wind turbine tower.

In one embodiment is the winch apparatus carried by a winch frame being operatively connected to the lower skid via a heave compensating apparatus. A heave compensating apparatus is of particular interest when an assembled wind turbine is to be landed onto a floating foundation, and particularly when the device according to the invention is a floating vessel subject to ocean waves. Preferably, the heave compensating apparatus is operatively connected to the lower skid by means actuators being individually operable. Individually operable actuators may provide a “floating” winch frame. A floating winch frame is particularly advantageous when there is a need for adjusting a longitudinal axis of the assembled wind turbine with respect to a longitudinal axis of the assembling structure, i.e., with respect to a z-direction of the assembling structure. A number of individually operable actuators are at least three, preferably more than three. In a model of a prototype of the hoisting device, the number of actuators was six.

The actuators may be fluid operated or electrically operated. The actuators may be controlled by means of a control system known per se. The control system may be configured for receiving signals from a weight sensor measuring the weight of the load and movement sensors identifying (i) the position of the load within the assembling structure, (ii) the position of the actuators and, in the event of active compensation, (iii) the position of the load in relation to the body which the load is being lifted onto (or off).

To render possible multiple operations, such as bringing wind turbine towers into a storage area of the device, while at the same time assembling a nacelle onto a wind turbine tower, and/or assembling rotor blades onto the hub of the nacelle, the hoisting device may the hoisting device may comprise two hoisting devices configured for being operated independently of each other. Thereby, an effective operation may be achieved.

The passages in the assembling structure may comprise a first passage in a first side portion of the assembling structure for passing the wind turbine tower into the space, and a second passage in a second side portion of the assembling structure for passing an assembly of the wind turbine tower and the nacelle to a rotor blade assembly position at an outside of the assembling structure. In one embodiment is the first side portion perpendicular to the second side portion. In an alternative embodiment is the first side portion in parallel to the second side portion. An advantage of arranging the first passage perpendicular to the second passage, is that the assembling structure may extend from a corner portion of the base and thereby occupy as small area of the base as possible.

The assembling structure may further comprise a passage in a fourth side portion of the assembling structure, wherein the passage is configured for passage of an upright wind turbine tower that has been passed through the first passage, to a temporary storage area. Such a third passage renders possible a storage of one or more upright wind turbine towers in a storage area outside the assembling structure.

As mentioned above, the device according to the invention may be a floating vessel. Thus, the base may be a deck arranged on top of a hull of a floating vessel. Although the device according to the invention may be arranged onshore, for example at a shipyard or a quay, there are advantages of providing the device in the form of a floating vessel. One advantage of providing the device in the form of a floating vessel is that a floating vessel may operate offshore at a location where an offshore wind park is to be established, or wherein there is a need for bringing a wind turbine onboard for servicing purpose. Another advantage of providing the device in the form of a floating vessel is that a floating vessel may install the wind turbine onto a support extending from a bottom of the sea. Still another advantage of providing the device in the form of a floating vessel is that a floating vessel can operate in a sheltered area, such as for example a fjord, being as close as possible to an operating location of the wind turbine. Thus, a towing distance of a floating foundation carrying a wind turbine, may be considerably reduced as compared to towing a floating foundation from an onshore location that may be far away from the operating location of the wind turbine. A towing distance being as small as possible is advantageous with respect to time needed to bring the wind turbine to the location of operation, and also with respect to a so-called weather window for performing the towing operation.

In a second aspect of the invention, there is provided a method for facilitating assembling of a wind turbine. The method comprising:

- providing the device according to the first aspect of the invention;
- connecting the hoisting device to a top portion of the wind turbine tower and bringing the wind turbine tower into the space of the assembling structure;
- supporting a lower portion of wind turbine tower by means of the support arrangement;
- disconnecting the hoisting device from the top portion of the wind turbine tower, connecting the hoisting device to the nacelle of the wind turbine, hoisting the nacelle on top of the wind turbine tower, and assembling the nacelle thereto;
- hoisting, by means of the hoisting device, the assembly of the wind turbine tower and the nacelle to a rotor blade assembly position on an outside of the assembling structure; and
- bringing, by means of the rotor blade manipulator, the rotor blades from a rotor blade storage area into contact with the hub of the nacelle, and securing the rotor blades thereto.

When hoisting the wind turbine tower and the nacelle to a rotor blade assembly position on an outside of the assembling structure, a lower en portion of the wind turbine tower is preferably connected to a cradle operatively connected to the track to support the lower end portion of the assembly. Thus, hoisting of the assembly of the wind turbine tower and nacelle may comprises hoisting and skidding the assembly to the rotor assembly position on the outside of the assembling structure.

The method according to the second aspect of the invention may comprise passing at least two wind turbine towers into the space and storing at least one of the at least two wind turbine towers in an upright position in a temporary storage area on the device, while assembling the nacelle to one of the at least two wind turbine towers.

The method may further comprise passing at least two wind turbine towers into the space and storing at least one of the at least two wind turbine towers in an upright position in a temporary storage area on the device, and assembling the nacelle to one of the at least two wind turbine towers.

Preferably, the method comprises providing the hoisting device support structure with two hoisting devices configured for being operated independently of each other, and using one of the hoisting devices to pass one or more wind turbine towers to the temporary storage area while the other one of the hoisting devices being used for assembling a nacelle to a wind turbine tower. Operating two hoisting devices may increase an efficiency of the device, as the device may provide a manufacturing line.

The method may further comprise supporting the wind turbine sideways by means of guides when being in the rotor blade assembly position, wherein at least one of the guides are movably connected to a side portion of the of the assembling structure, and lowering the wind turbine into contact with a wind turbine foundation, and disconnecting the wind turbine from the device. The wind turbine foundation is selected from a floating foundation or a foundation extending from a bottom of a sea.

The wind turbine may be lowered into contact with a wind turbine support by means of the hoisting device operatively connected to the nacelle of the wind turbine. However, it is preferred that wind turbine is lowered into contact with a wind turbine foundation by means of the hoisting device operatively connected to a portion of the turbine tower of the wind turbine. In this preferred method the nacelle of the wind turbine may be designed for carrying it own weight only, and not the total weight of the nacelle and the tower.

In a third aspect of the invention there is provided a hoisting device operatively connected to a hoisting device support structure arranged on top of a support structure extending from a base, the hoisting device comprising:

- an upper skid movably connected to a first skid support forming part of the hoisting device support structure, the upper skid movable in a first direction in a plane being parallel to the base;
- a lower skid moveably connected to a second skid support forming part of the upper skid, the lower skid movable in a second direction in a plane being parallel to the base, the second direction being transverse to said first direction; and
- a winch apparatus operatively connected to the lower skid.

In one embodiment is the winch apparatus carried by a winch frame being operatively connected to the lower skid via a heave compensating apparatus. A heave compensating apparatus is of particular interest when an assembled wind turbine is to be landed onto a floating foundation, and particularly when the device according to the invention is a floating vessel subject to ocean waves. Preferably, the heave compensating apparatus is operatively connected to the lower skid by means actuators being individually operable. Individually operable actuators may provide a “floating” winch frame. A floating winch frame is particularly advantageous when there is a need for adjusting a longitudinal axis of the assembled wind turbine with respect to a longitudinal axis of the assembling structure, i.e., with respect to a z-direction of the assembling structure. A number of individually operable actuators are at least three, preferably more than three. In a model of a prototype of the hoisting device, the number of actuators was six.

In a fourth aspect a hoisting device operatively connected to a hoisting device support structure arranged on top of a support structure extending from a base, the hoisting device comprising:

- a skid movably connected to a skid support forming part of the hoisting device support structure, the skid movable in parallel to the base;
- a winch apparatus operatively connected to the skid, wherein the winch apparatus carried by a winch frame being operatively connected to the skid via a heave compensating apparatus.

Preferably, the heave compensating apparatus is operatively connected to the skid by means actuators being individually operable. Individually operable actuators may provide a “floating” winch frame. A number of individually operable actuators are at least three, preferably more than three.

The actuators may be fluid operated or electrically operated. The actuators may be controlled by means of a control system known per se. The control system may be configured for receiving signals from a weight sensor measuring the weight of the load and movement sensors identifying (i) the position of the load within the assembling structure, (ii) the position of the actuators and, in the event of active compensation, (iii) the position of the load in relation to the body which the load is being lifted onto (or off).

BRIEF DESCRIPTION OF THE DRAWINGS

In the following is described an example of a preferred embodiment illustrated in the accompanying drawings, wherein.

DETAILED DESCRIPTION OF THE DRAWINGS

Figure 1:
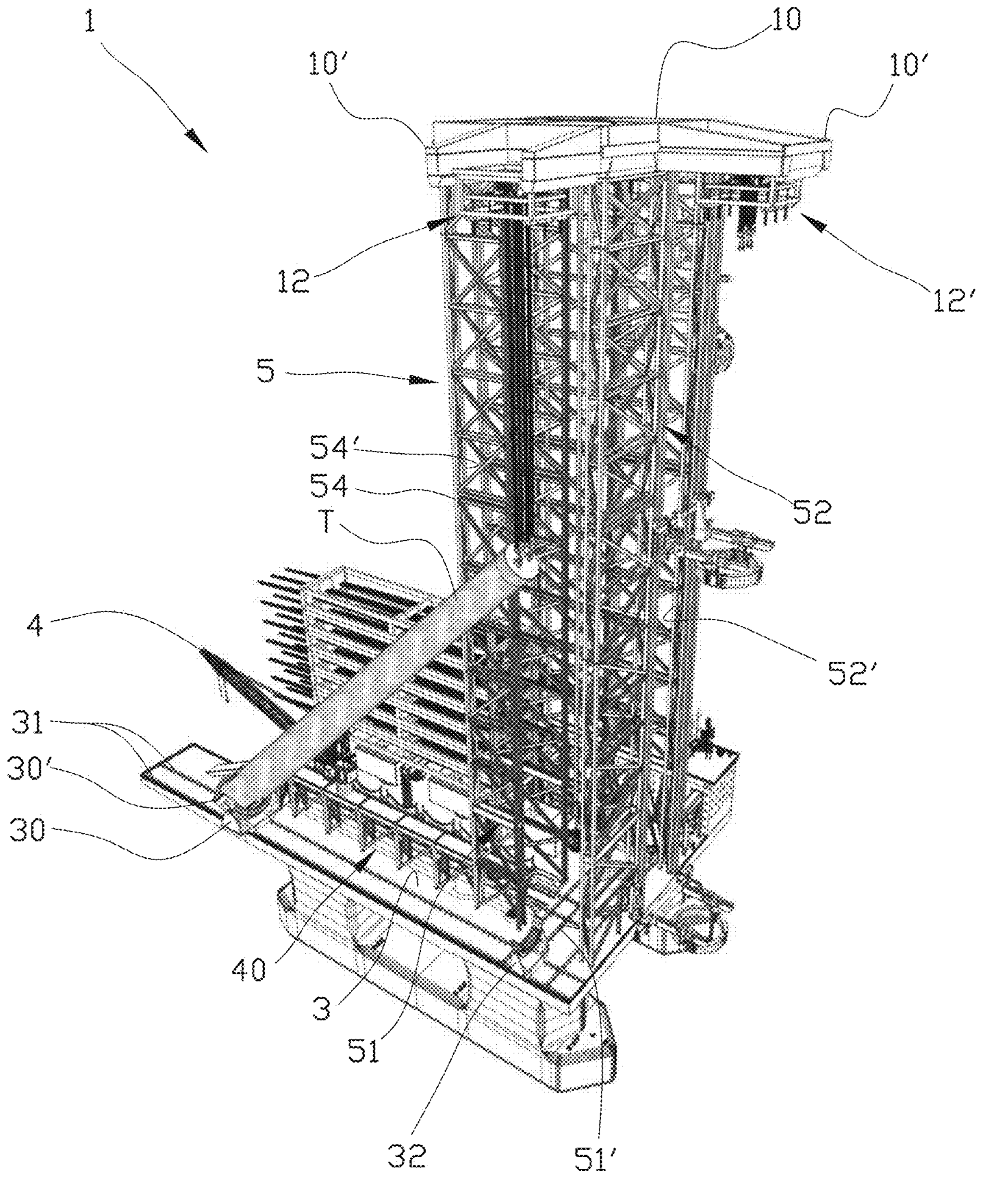
FIG. 1 shows a perspective view of the device according to the invention seen from a first direction, wherein the device is arranged on a floating structure, and wherein a wind turbine tower is in the process of being raised from a horizontal position.

Any positional indications refer to the position shown in the figures.

In the figures, same or corresponding elements are indicated by same reference numerals. For clarity reasons, several elements are in some of the figures without reference numerals.

A person skilled in the art will understand that the figures are just principal drawings. The relative proportions of individual elements may also be distorted.

In the figures, reference numeral 1 denotes a device according to the invention, wherein the device 1 is for facilitating assembling of a wind turbine WT.

The device 1, here shown as a floating structure in the form of a rig 1, comprises a base 3 extending in an x-y direction on top of a hull of the rig 1. In the embodiment shown, the base is therefore a rig floor 3. An assembling structure 5 extends upwardly in a z-direction from the rig floor 3.

The assembling structure 5 comprises a space defined by side portions 51, 52, 53, 54 of the assembling structure 5. In the figures, the side portions 51, 52, 53, 54 are shown as truss works. The assembling structure 5 further comprises tower passages 51', 52', 54' and a nacelle passage 54". The passages 51', 52', 54' and 54" extend between the base 3 and a hoisting device support structure 10 arranged on a top portion of the assembling structure 5. In the embodiment shown, two hoisting devices 12, 12' are movable connected to the hoisting device support structure 10. To render possible operation of the hoisting devices 12, 12' through the tower passages 51' and 52', the hoisting device support structure 10 is provided with protrusions 10' extending beyond the side portions 51 and 52.

The device 1 further comprises a support arrangement for supporting a portion of a wind turbine WT, and a rotor blade manipulator 20 as will be described in detail below.

In FIG. 1 a wind turbine tower T has been brought onboard the rig 1 from a transport vessel, such as a barge (not shown), by means of a supply crane 4. An upper portion of the wind turbine tower T is connected to a hoisting device 12 that has been moved to the protruding portion 10' of the hoisting device supporting structure 10. A lower portion of the wind turbine tower T is carried by a support 30, here in the form of a feeding carriage 30 movable along an L-shaped track 31, here shown as a pair of beams secured to the rig floor 3. The carriage will hereinafter also be denoted cradle.

The feeding cradle 30 comprises a pivotable wind turbine engagement portion 30' that secures the lower end portion of the wind turbine tower T against undesired movement when being raised from a horizontal position to a vertical position.

Prior to commencing raising of the wind turbine tower T, the upper portion of wind turbine tower T is supported by a movable support cradle 32.

In FIG. 1 is the wind turbine tower T is in the process of being raised from a substantially horizontal position to a vertical position. By horizontal position is meant a position wherein a longitudinal axis of the wind turbine tower T is substantially in parallel with an x- or y-axis of the base or rig floor 3. By vertical position is meant a position wherein a longitudinal axis of the wind turbine tower T is substantially in parallel with the z-axis of the assembling structure 5.

Figure 2:
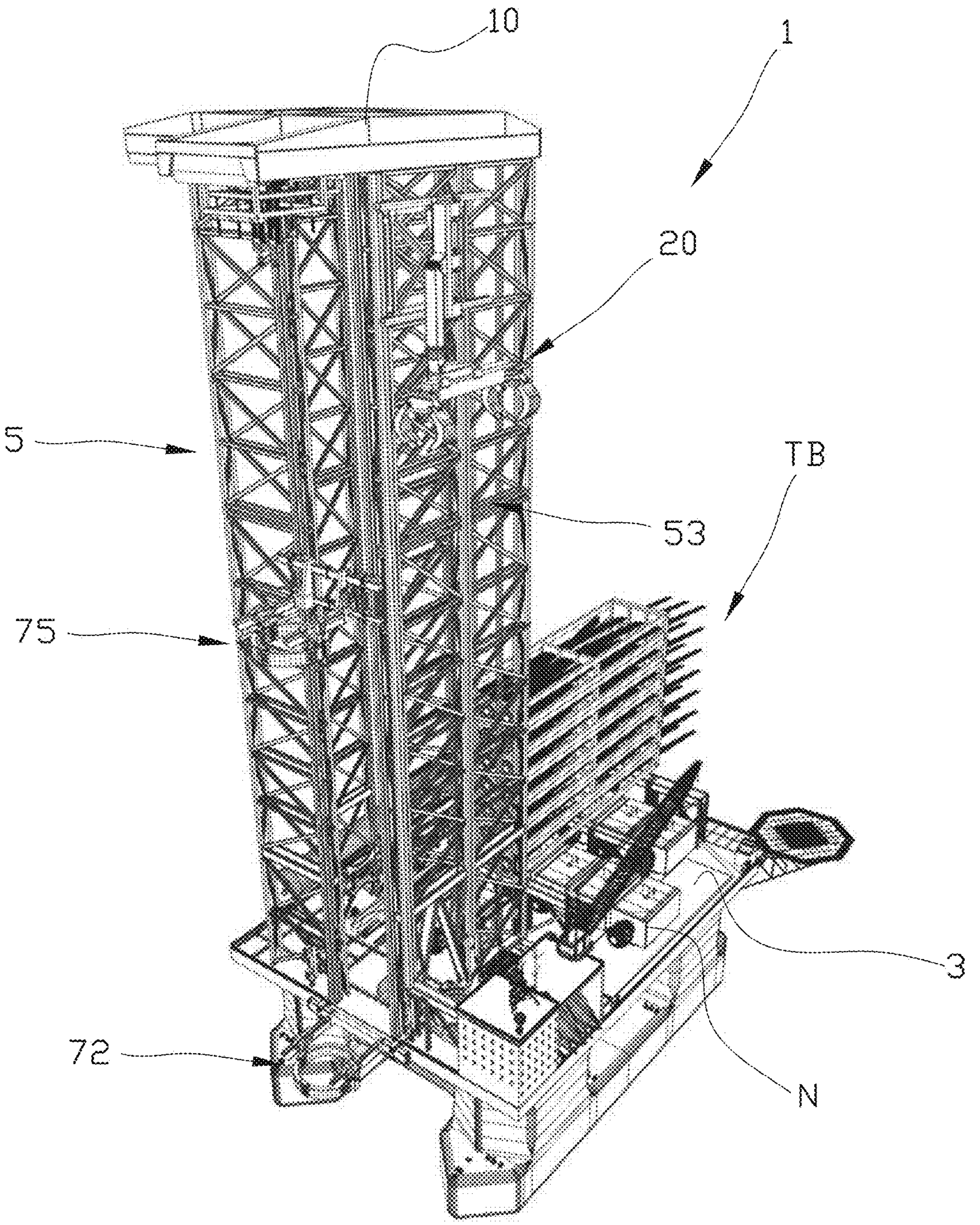
FIG. 2 shows in larger scale a perspective view of a portion of the device, seen from a second direction.

FIG. 2 shows the wind turbine tower T in a horizontal position and supported by the feeding cradle 30 and the support cradle 32 shown in FIG. 1. Several nacelles N are stored on the rig floor 3, and several sets of rotor blades TB are stored in a rack on the rig floor 3.

Figure 3:
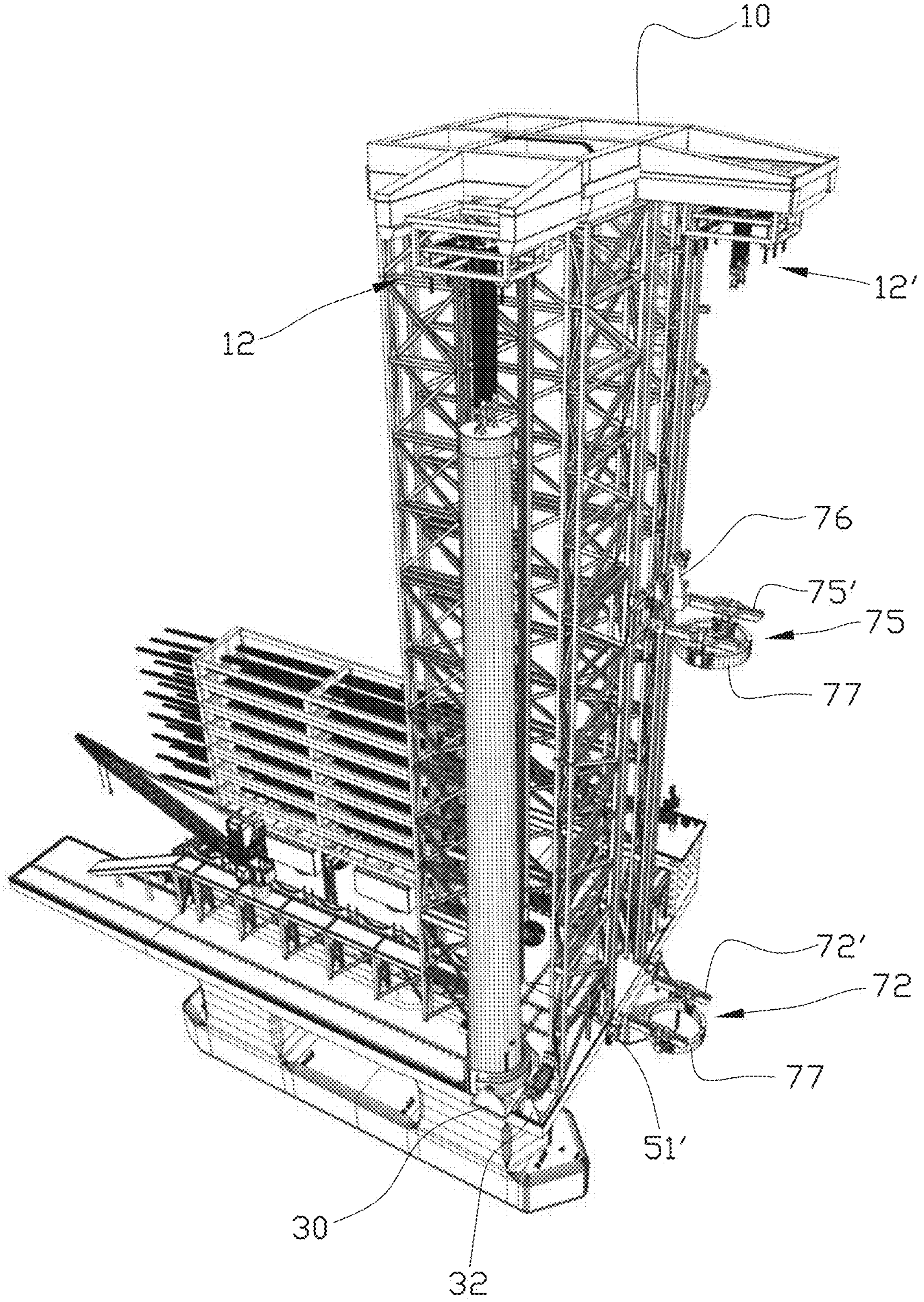
FIG. 3 shows the same as FIG. 1, but wherein the wind turbine tower has been raised to an upright position on an outside of a first passage of an assembling structure.
Figure 4:
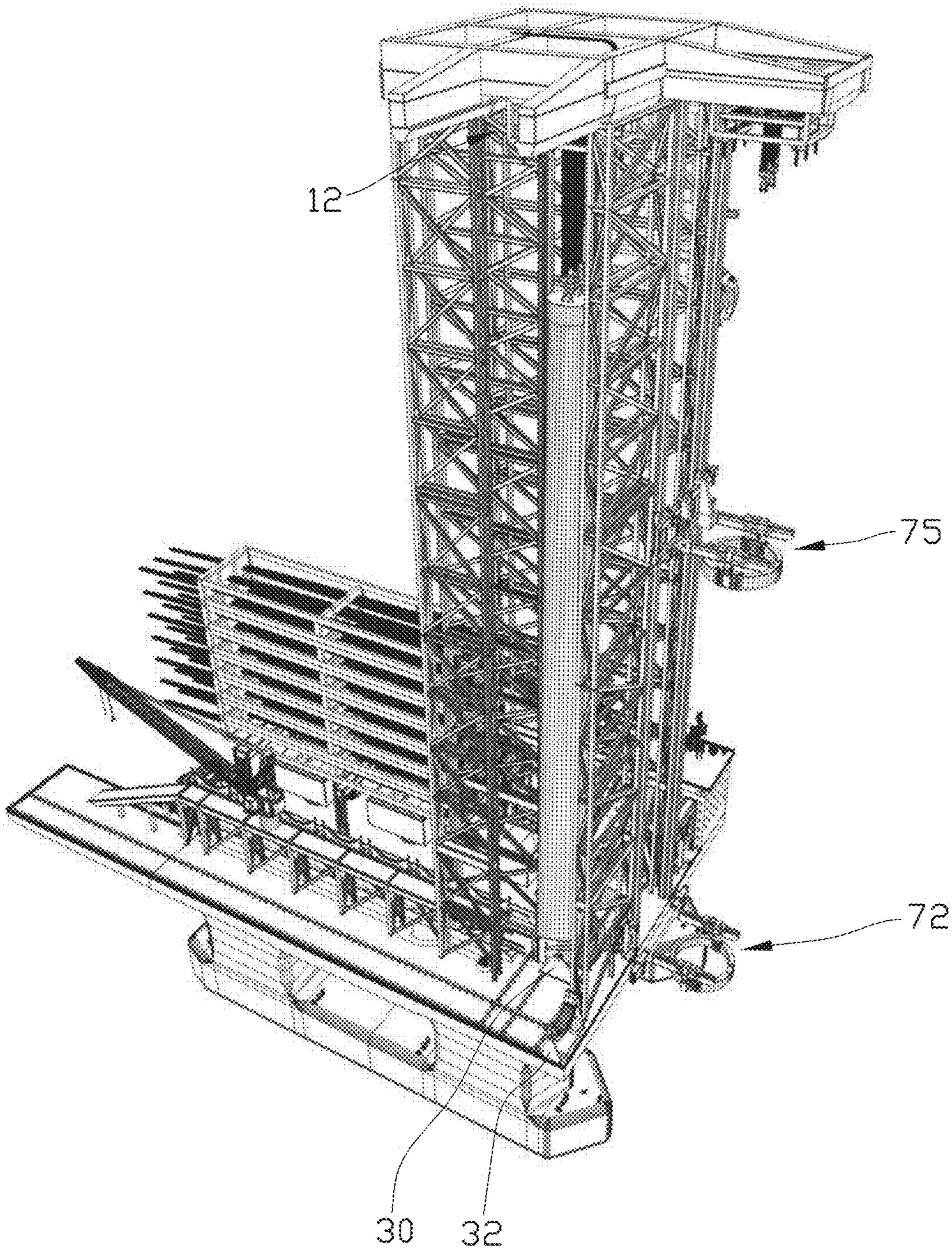
FIG. 4 shows the upright wind turbine tower after having passed into a space of the assembling structure.

In FIGS. 3 and 4 the wind turbine tower T passes and has passed, respectively, the tower passage 51' while still being connected to the hoisting device 12 and the feeding cradle 30. The support cradle 32 has been moved to an end portion of a leg of the L-shaped track 31 to allow passage of the feeding cradle 30 into the passage 51'.

Figure 5:
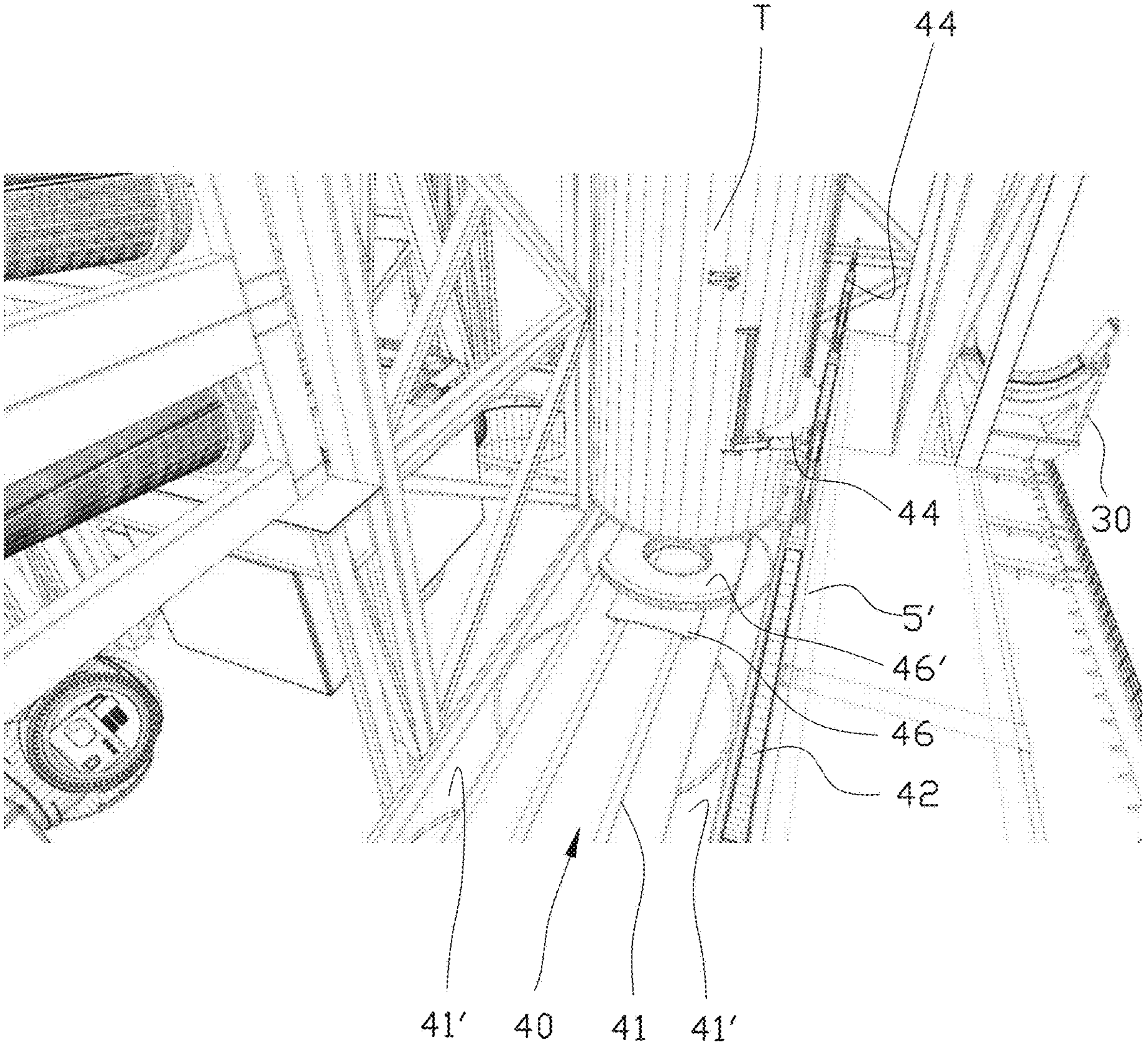
FIG. 5 shows in larger scale a lower portion of a wind turbine tower, wherein the wind turbine tower being lowered towards a carriage while being operatively connected to a gripping means being movably connected to the assembling structure via a guideway.
Figure 6:
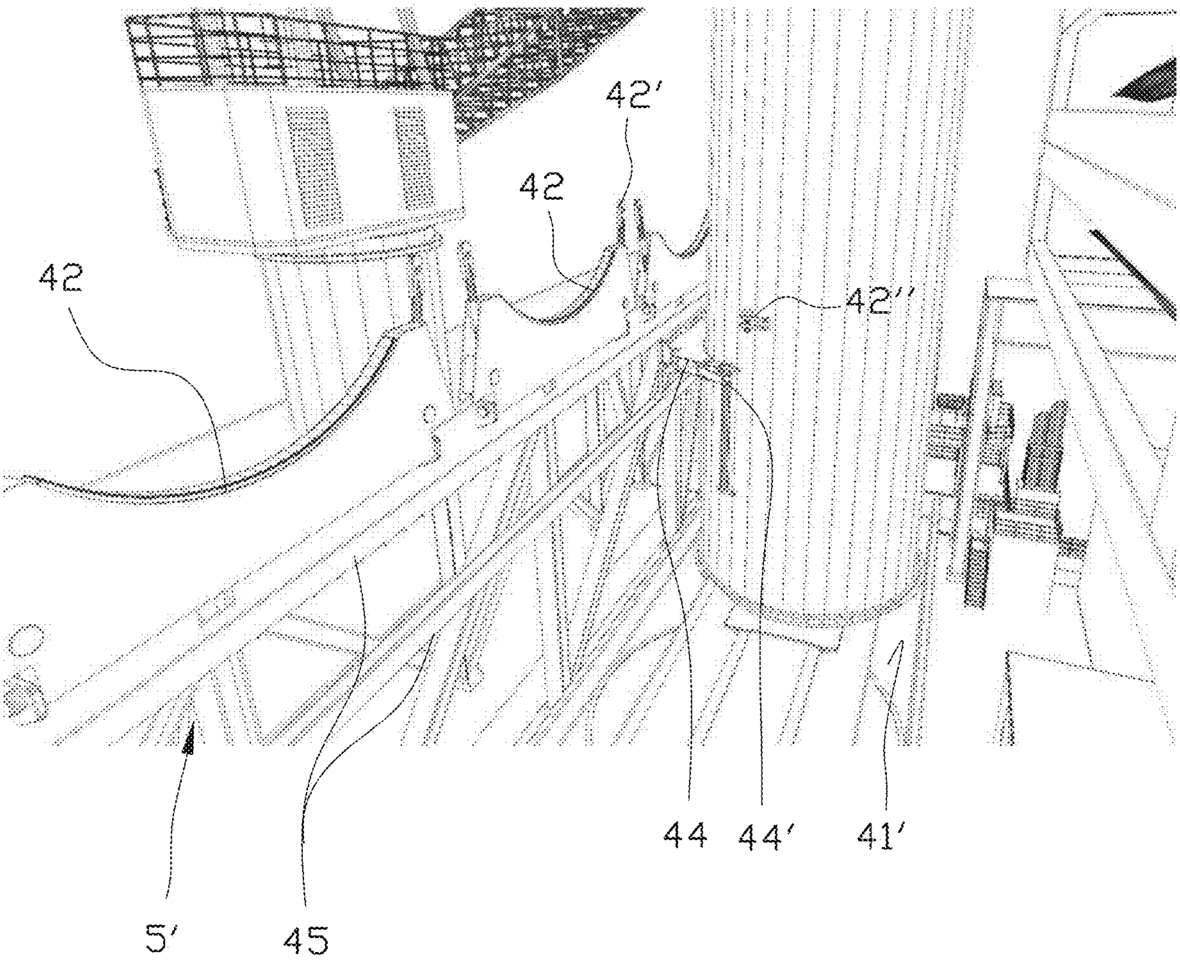
FIG. 6 shows in a smaller scale the wind turbine tower after being lowered onto the carriage, wherein the movable gripping means are still engaging the wind turbine tower.

Turning now to FIGS. 5 and 6 showing wind turbine tower T being within a temporary storage are 40 configured for storing a plurality of wind turbine towers T on the rig or device 1.

FIG. 5 depicts a wind turbine tower T being at an entrance of the temporary storage area 40. The temporary storage area 40 is provided with a plurality of supports in the form of stationary storage grippers 42 secured to a portion of a support structure 5' extending from within the space of the assembling structure 5 and along the rig floor 3 to an outside portion of a fourth side portion 54 (see for example FIG. 7) of the assembling structure 5.

As best seen in FIG. 6, the stationary storage grippers 42 are individually pivotable between a passive first position (as shown), and an active second position wherein a pair of gripping arms 42' of a storage gripper 42 has engaged a connector portion 42" of the wind turbine tower T. The gripping arms 42' may typically be fluid operated. The gripping arms 42' may be connected to the connector portion 42" by use of a fluid or electric locking mechanism.

In addition to the stationary grippers 42, the temporary storage area 40 is further provided with a support in the form of a movable gripper 44 that is movable along a guideway 45 secured to the support structure 5'. Like the stationary grippers 42, the movable gripper 44 is pivotable between a passive first position and an active second position (FIGS. 5 and 6 show the movable gripper 44 being in the active second position) wherein gripping arms 44' are in engagement with a rod forming part of the wind turbine tower T.

In FIG. 5, the wind turbine tower T has been lifted by the hoisting device 12 (not shown in FIG. 5) and released from the feeding cradle 30 used for bringing the wind turbine tower T into the space of the assembling structure 5. The hoisting device 12 has moved the wind turbine tower T away from the L-shaped track 31, and into a storage track 41 of the temporary storage area 40. Details of the hoisting device 12 will be explained below.

The storage track 41 is provided with a further support in the form of a storage cradle 46 configured for bringing, together with the movable gripper 44 being in the active, gripping position, a wind turbine tower T in alignment with a desired one of the stationary grippers 42. The storage cradle 46 is movable along the storage track 41 extending between a pair of support beams having a support face 41' for supporting a lower end face of a wind turbine tower T when being in a storage position.

The storage cradle 46 is provided with a supporting disk 46' configured to move between a raised position wherein the supporting disk 46' is at a higher elevation than the support face 41' of the support beams, as shown in FIG. 5, and a lowered position wherein the supporting disk 46' is at a lower elevation than said supporting face 41' of the support beams.

A portion of the supporting disk 46' is configured to abut against a lower end face of the wind turbine tower T to carry the wind turbine tower 1 above the supporting face 41' of the support beams.

In FIG. 5, the supporting disk 46' has been aligned with a wind turbine tower T, while at the same time the movable gripper 44 has been brought to its active gripping portion and grips a lower end portion of the rod forming part of the wind turbine tower T.

After lowering the wind turbine tower T to abut against the supporting disk 46', the wind turbine tower T can be moved to a desired position of the temporary storage area 40.

Figure 7:
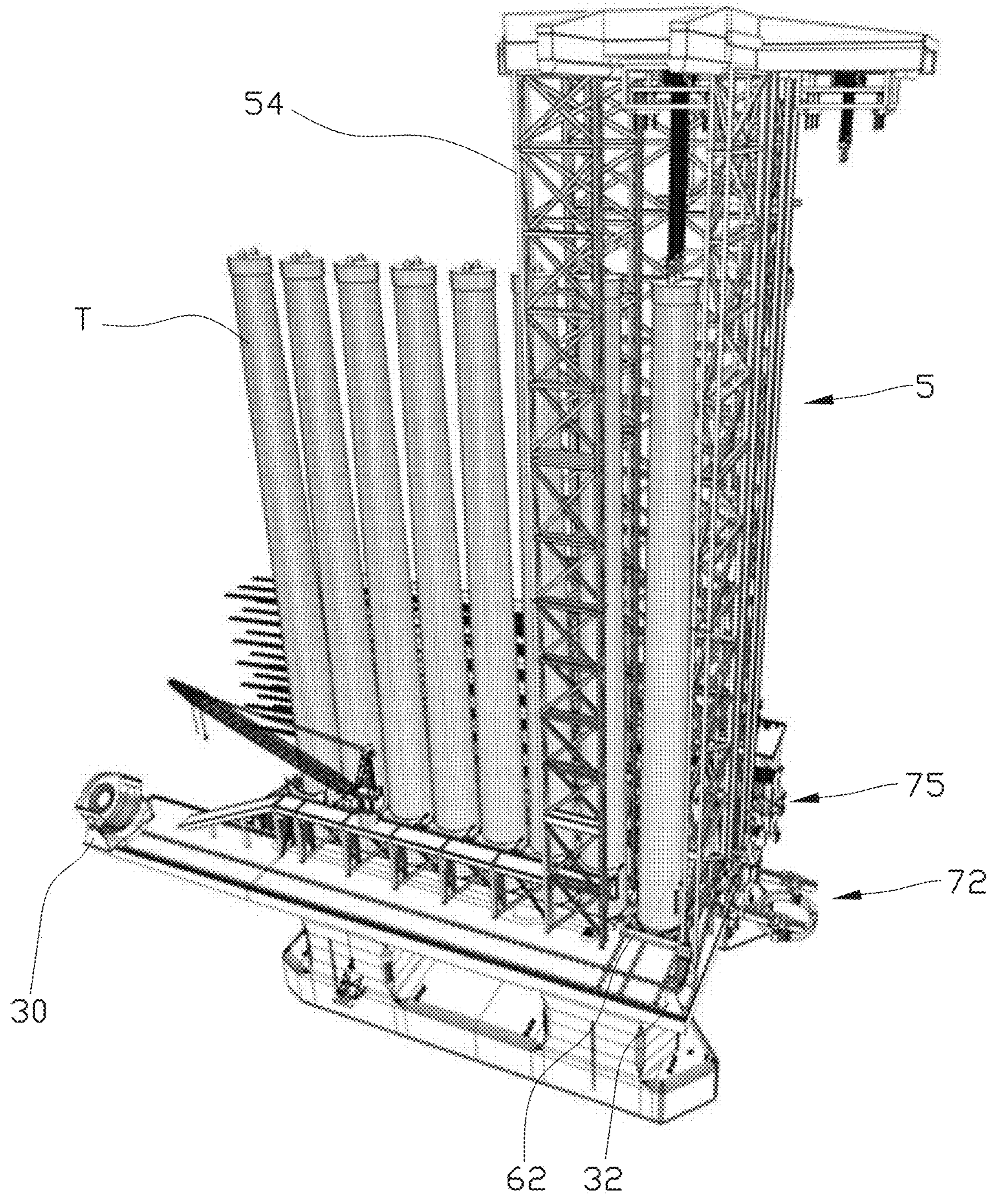
FIG. 7 shows the device in FIG. 4, but wherein a plurality of wind turbine towers are stored in a temporary storage area.

In FIG. 6, a first one of a plurality of wind turbine towers T is in the process of being moved to an outer end portion of the temporary storage area 40, i.e., to a position of the left wind turbine tower T shown in FIG. 7 showing seven wind turbine towers T stored in an upright position within the temporary storage area 40.

After arriving the desired position, the supporting disk 46' will be lowered to allow the wind turbine tower T to abut against the supporting face 41' of the support beams, while at the same time being supported by the movable gripper 44.

Prior to releasing the movable gripper 44 from its engagement with the wind turbine tower T, the stationary gripper 42 to which the wind turbine tower T has been aligned, is engaged with the wind turbine tower T. Thus, there is a grip-to-grip transfer between the movable gripper 44 and the stationary gripper 42.

After lowering of the supporting disk 46', the storage cradle 46 may be returned to carry another wind turbine tower T from the space within the assembling structure 5 to a desired position within the temporary storage area 40. This operation may be repeated until a desired number of wind turbine towers T has been received within the temporary storage area 40. In the example shown in FIG. 7 is seven wind turbine towers T stored in the temporary storage area 40, and one additional wind turbine tower T (the one to the left in FIG. 7) is carried by the feeding cradle 30 and the hoisting device being within the space of the assembling structure 5.

It should be noted that the fourth side portion 54 of the assembling structure 5 is provided with a tower passage 54' for allowing passing a wind turbine tower T to and from the space of the assembling structure 5.

When a nacelle N is to be assembled to a wind turbine tower T, the operation described above are substantially reversed and the wind turbine towers T are brought one by one to an assembling area by means of the hoisting device and a further cradle 62. The further cradle 62, hereinafter denoted an assembly cradle 62, is configured to move from an entrance of the temporary storage area 40 to a nacelle assembling area 60 within the space of the assembling structures 5.

Figure 8:
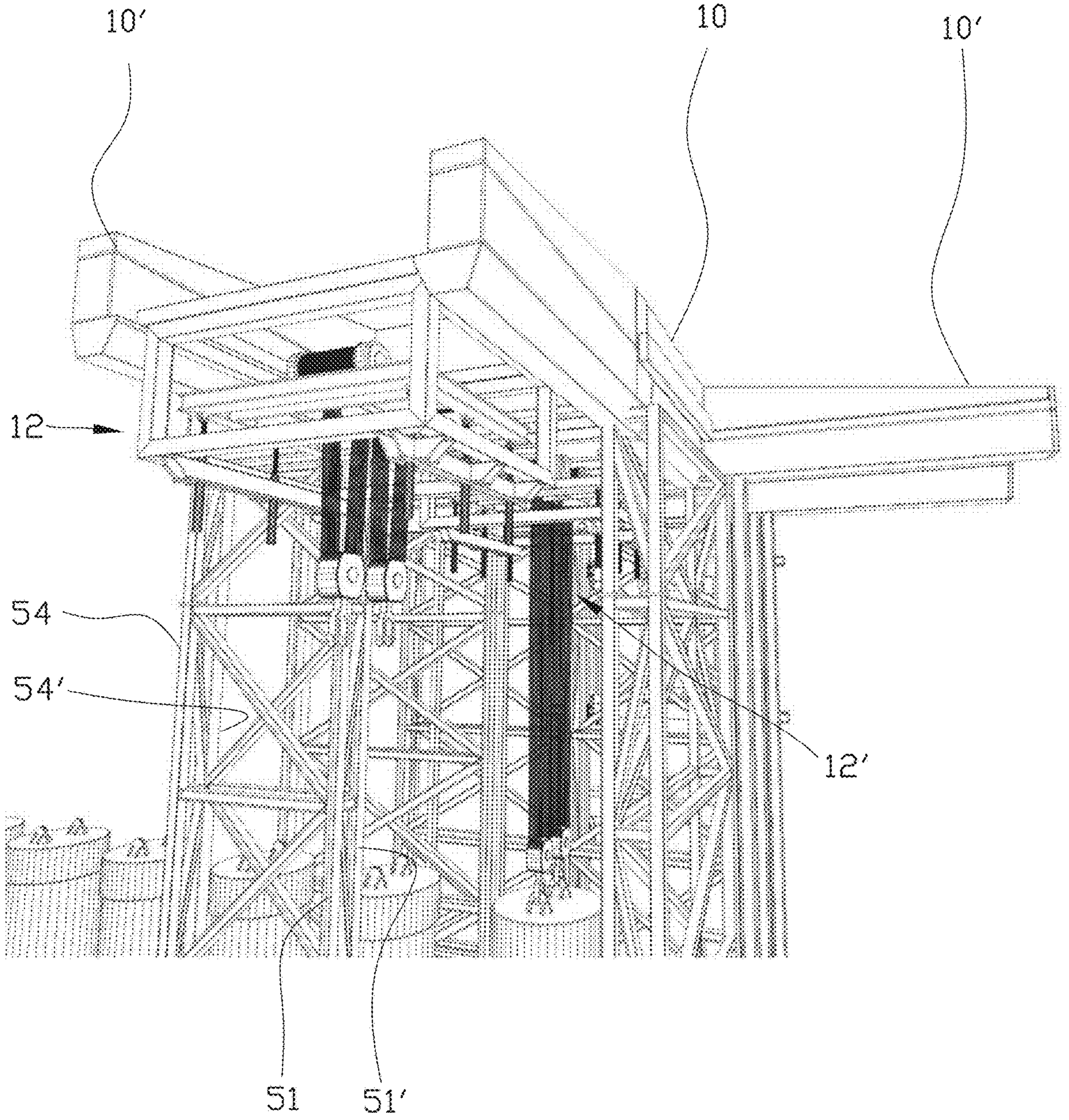
FIG. 8 shows a top portion of the assembling structure, wherein one hosting device is operatively connected to a top portion of a wind turbine tower.
Figure 11:
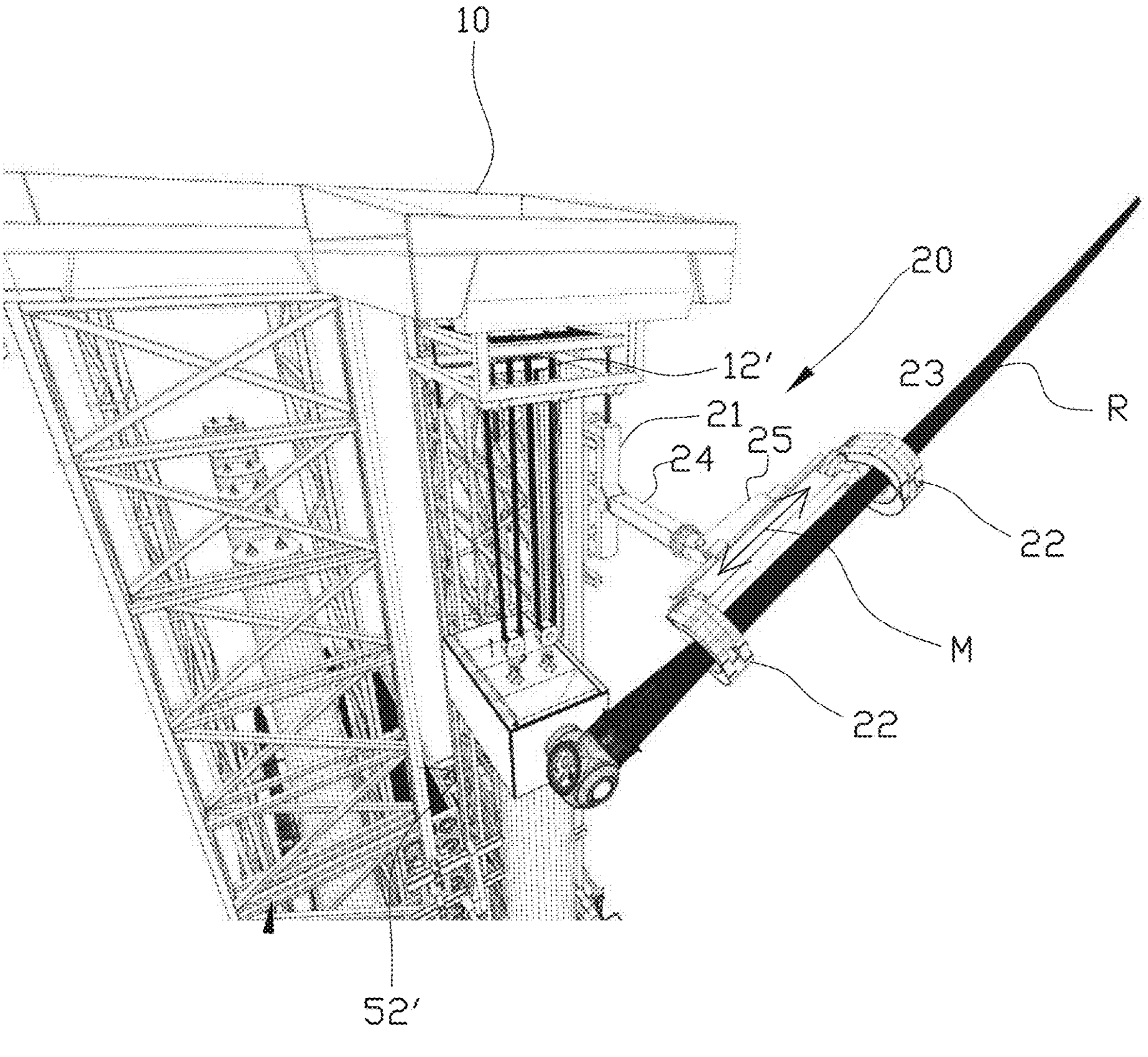
FIG. 11 shows a wind turbine tower that has been moved to a rotor blade assembly position at an outside of the assembling structure; wherein a rotor blade is moved towards a hub of the nacelle by means of a rotor blade manipulator.

In FIG. 7, a first hoisting device 12 (the one being closest to the passage 51' in the first side portion 51) is connected to the wind turbine tower T supported by the assembly cradle 62. This means that a second hoisting device 12' may be used for bringing a nacelle N into the space of the assembling structure 5 while the wind turbine tower T being brought to the assembling area 60. However, in FIG. 8 is the second hoisting device 12' connected to the wind turbine tower T supported by the assembly cradle 62. This means that the first hoisting device 12 may feed wind turbine towers T to the temporary storage area 40, while the second hoisting device 12' may be used for bringing a wind turbine tower T to the nacelle assembling area 60 for assembly of a wind turbine tower T and nacelle N. The second hoisting device 12' is also used for bringing an assembly of wind turbine tower T and a nacelle N past the second passage 52' in the second side portion 52 of the assembling structure 5, to a rotor blade assembling area 70 on the outside of the second side portion 52 as shown in FIG. 11.

Figure 9:
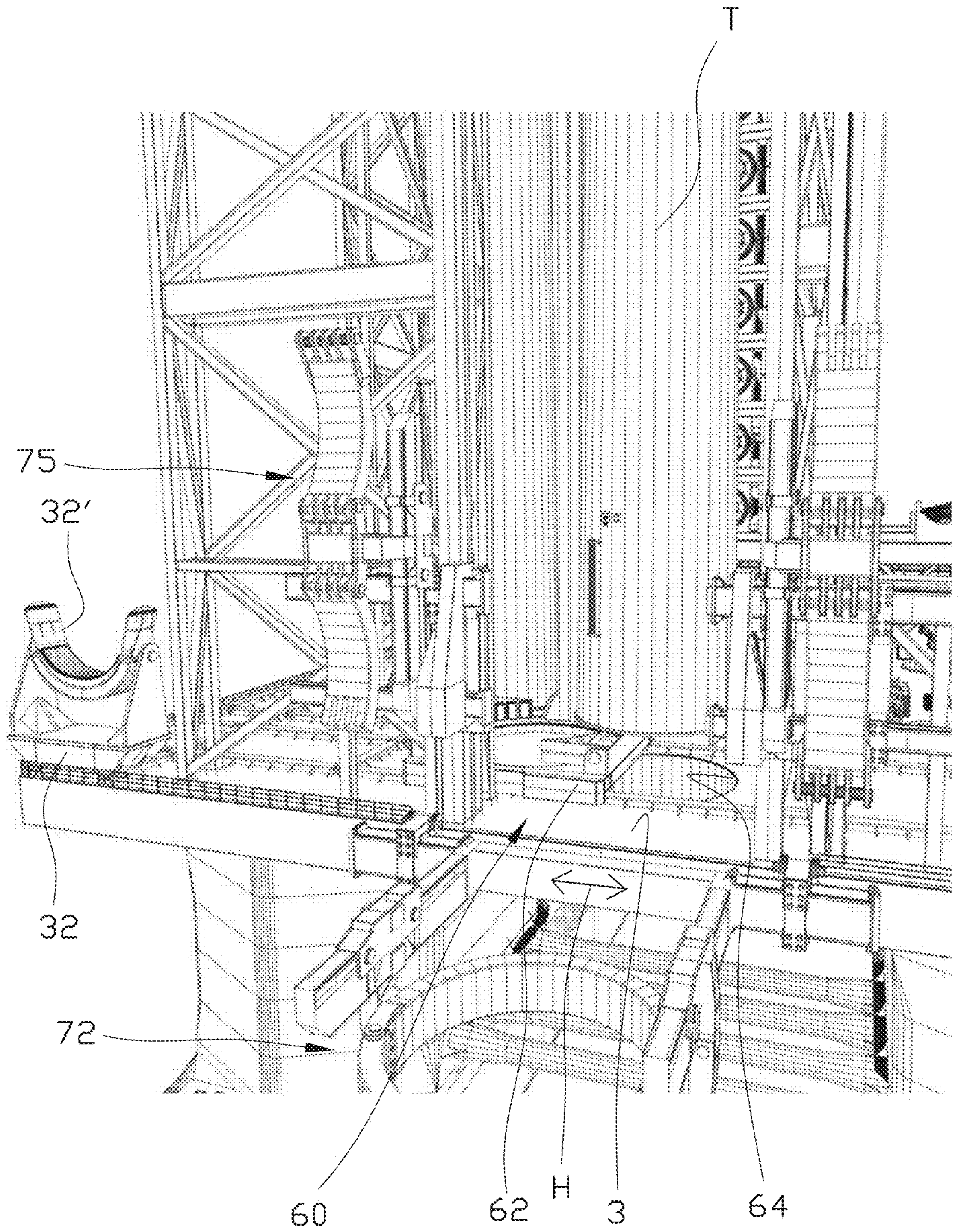
FIG. 9 shows a lower portion of a wind turbine tower, wherein the wind turbine tower has been disconnected from a carriage and is in the process of being prepared for entering a receptacle extending downwardly from an aperture in a base.
Figure 10:
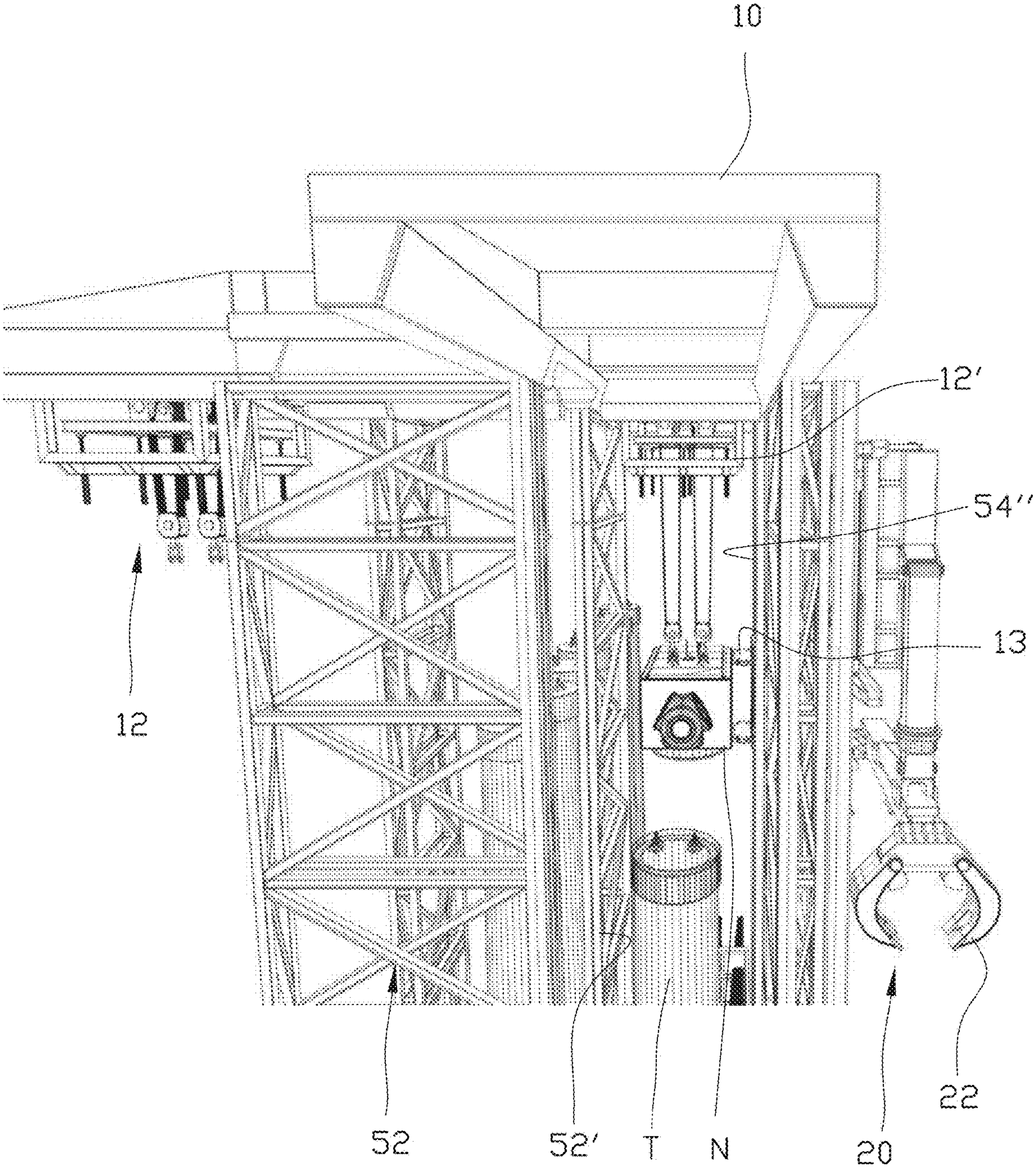
FIG. 10 shows in smaller scale top portion of the assembling structure, wherein a nacelle is hoisted towards a top portion of a wind turbine tower.

Turning first to FIG. 9 depicting a wind turbine tower T that has been brought to the nacelle assembling area 60 by means of the first hoisting device 12 (see FIG. 7), or the second hoisting device 12' (see FIG. 8) while supported by the assembly cradle 62. The nacelle assembly area 60 comprises a receptacle 64 extending downwardly from the deck 3 of the rig 1. The purpose of the receptable 64 is to support a lower end portion of the wind turbine tower T that has been prepared for receiving a nacelle N, as shown in FIG. 10. Thus, the receptacle 64 forms part of the support arrangement of the rig 1.

In FIG. 9, the wind turbine tower T has been released from the assembly cradle 62 by lifting the wind turbine tower T by the second hosting device 12' (not shown). When the wind turbine tower T is lifted, the assembly cradle 62 is moved away from the receptacle 64 (to the left in FIG. 9). The assembly cradle 62 may now be returned to the storage area 40 to receive a wind turbine tower T by means of the first hoisting device 12.

In FIG. 9, the wind turbine tower T hangs from the second hoisting device 12'. Thus, the wind turbine tower T may move sideways with respect to the assembly structure 5 when the rig 1 is subject to ocean waves. Any sideways movement of the wind turbine tower T with respect to the assembling structure 5, may cause challenges with respect to lower the end portion wind turbine tower T into the receptacle 64. To mitigate this challenge, the rig 1 may be provided with a guiding means, for example in the form of extensible alignment arms (not shown) operatively connected to a portion of the assembling 5 structure or a portion of the deck 3 of the rig 1. Such extensible alignment arms are configured for aligning a lower end portion of the wind turbine tower T with respect to the receptacle 64. Preferably, an end portion of such alignment arms configured for abutting against the wind turbine tower T and are provided with rollers for rolling along the wind turbine tower T when being lowered into the receptacle 64. As an alternative to such alignment arms, the receptacle 64 itself may be provided with an extensible guiding means, for example in the form of a conical body (not shown) movable along a longitudinal axis of the receptacle 64.

As an alternative to the receptacle 64 arranged in the assembling area 60, the nacelle assembling area 60 may be provided with another type of supporting means, for example gripping arms configured to support the wind turbine tower T while being in the nacelle assembling area 60. Such an alternative to the receptacle 64 shown in FIG. 9, may be of particular relevance when the device 1 according to the invention is arranged onshore, for example on a quay, instead of on a rig 1 as shown in the figures.

FIG. 10 shows a nacelle N being lifted by the second hoisting device 12'. A lower end portion of the wind turbine tower T is supported within the receptacle 64 shown in FIG. 9. The nacelle N itself has been slid from a nacelle temporary storage area (see FIG. 2) and into the space of the assembling structure 5 by means of a nacelle carriage (not shown) movable along a track extending through the nacelle passage 54" in the fourth side portion 54. However, in an alternative embodiment (not shown) the hoisting device supporting structure 10 may be provided with an additional protrusion like the protrusions 10' protruding beyond the first side portion 51 and the second side portion 52. Such an additional protrusion allows the second hoisting device 12' to connect to a nacelle N being on an outside of the nacelle passage 54". While being lifted by the second hoisting device 12', the nacelle N is supported by a dolly 13 movably connected to the assembling structure 5 via a track (not shown). In one embodiment is the dolly 13 further configured to move also in a horizontal direction wherein grippers are displaceable with respect to a dolly cradle (not shown).

In FIG. 11 has the assembly of the wind turbine tower T and the nacelle N been hoisted to a rotor blade assembling area 70 on an outside of the second side portion 52 of the assembling structure 5, wherein the assembly is still secured to the second hoisting device 12,'.

A rotor blade manipulator 20 is movably connected to the third side portion 53 of the assembling structure 5. The rotor blade manipulator 20 comprises a manipulator cradle 21 operatively connected to a manipulator track extending between the deck 3 and the hoisting device supporting structure 10. The rotor blade manipulator 20 comprises further a pair of blade grippers 22 arranged mutually spaced at opposite end portions of a gripper holder arm 23. The rotor blade manipulator 20 further comprises a first manipulator arm 24 pivotably connected to the manipulator cradle 21, and a second manipulator arm 25 rotatably connected to an end portion of the first manipulator arm 24. The gripper holder arm 23 is movably connected to the second manipulator arm 25 as indicated by an arrow M in FIG. 11.

After aligning a longitudinal axis of the rotor blade R with respect to the hub of the nacelle N, but prior to bringing a root of the blade R into contact with the hub, the gripper holder arm 23 is activated to move the root of the blade B in contact with a hub of the nacelle N.

Any movement of the rig 1 due to waves, does not influence the above operation of connecting the rotor blade R to the hub of the nacelle N. This because a body of the wind turbine tower T is secured against unintended sideways movement by means of a first guide 72 and a second guide 75. As seen best in FIGS. 1, 3 and 4, the first guide 72 is operatively connected to and protrudes from a portion of the deck 3 of the rig 1, while the second guide 75 comprises a cradle 76 movably connected to a track secured to the second side portion 52 of the assembling structure 5. The track extends between the deck 3 of the rig 1 and the hoisting device support structure 10.

Figure 12:
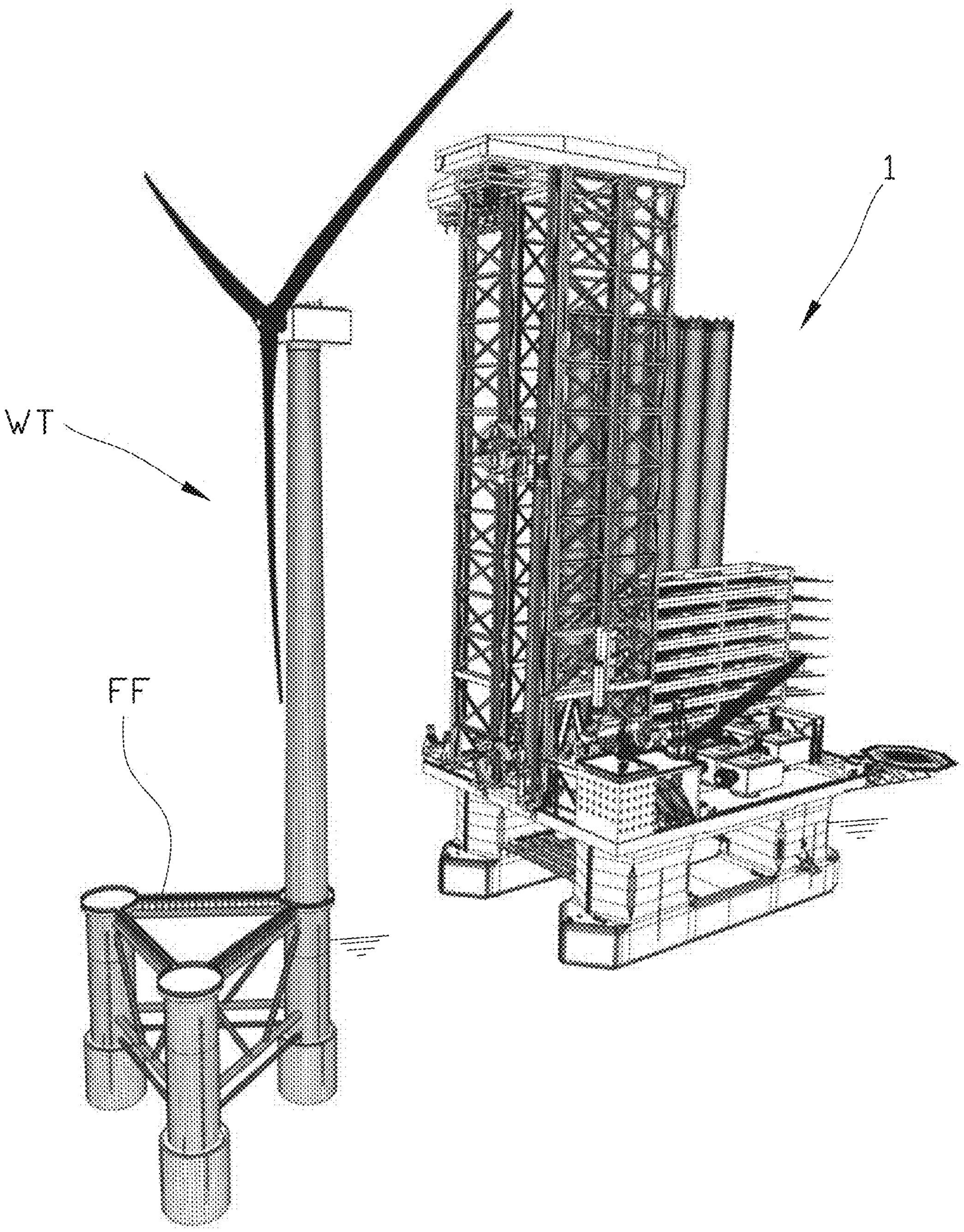
FIG. 12 shows in a smaller scale a wind turbine connected to a floating foundation, and wherein the device moves away from the wind turbine.

Each of the first guide 72 and the second guide 75 comprises a pair of arms 72' and 75', respectively. The pairs of arms 72', 75' are configured to pivot between an active position as shown for example in FIG. 1, and a passive position as shown in FIG. 12.

As best seen in FIG. 3 each guide 72, 75 comprises a gripping portion 77 operatively connected to the arms 72', 75'. The gripping portion 77 of each guide 72, 75 is configured to enclose a portion of the wind turbine tower T and comprises a first semicircular portion and an openable second semicircular portion. The openable second semicircular portions comprise a pair of pivotable grippers pivotably connected to end portions of the semicircular portion. When being in an open position, the grippers allow the wind turbine tower T to enter the gripping portion 77, or more precisely, allow the guides 72, 75 to pivot from a passive position wherein the arms 72', 75' are substantially in parallel with the second side portion 52 of the assembling structure 5, to protruding position shown for example in FIG. 3.

In FIG. 9 is the second guide 75 is shown in a passive position wherein the grippers are in an open position.

When the guides 72, 75 are in their active position and the grippers of the gripping portion 77 are in the closed position, each guide 72, 75 encloses a portion of the wind turbine tower T, thereby preventing undesired sideways movement of the wind turbine WT with respect to the assembling structure 5.

However, when the wind turbine WT is to be connected a floating or stationary foundation (a floating foundation FF is illustrated in FIG. 12), any movement of the rig 3 is independent of any movement of the foundation FF. For an onshore device 1 according to the invention, a floating foundation FF may move with respect to for example a quay forming the base of the invention.

Since the wind turbine tower T is secured to the assembling structure 5 and the deck 3 of the rig 1 via the first guide 72 and the second guide 75, respectively, and since for any movement of a floating structure FF cannot be controlled, the guides 72, 75 are provided with alignment means.

The alignment means of the first guide 72 is configured for moving in one direction with respect to the deck 3 of the rig 1, for example in an x-direction, as illustrated by arrow H in FIG. 9.

The grippers 77 of at least the first guide 72, but in one embodiment also the grippers 77 of the second guide 75, is further configured for moving along the arms 72', possibly 75', in parallel with the arms 72', possibly 75'. The movements are hydraulically operated and controlled by sensors sensing a position of a wind turbine receiving portion of the foundation FF (see FIG. 12). Thus, any relative movements between the device 1 according to the invention and a foundation may be compensated by the movable grippers 77.

In FIG. 12, a wind turbine WT has been installed on a floating foundation FF by means of the device 1 according to the invention. The device, or rig 1, is in FIG. 12 moving to a new location for assembling and installing a further wind turbine WT. Since a number of wind turbine towers T, nacelles N, and rotor blades R are already stored on the rig 1, an assembly of the wind turbine WT may take place during voyage to a next location.

Figure 13A:
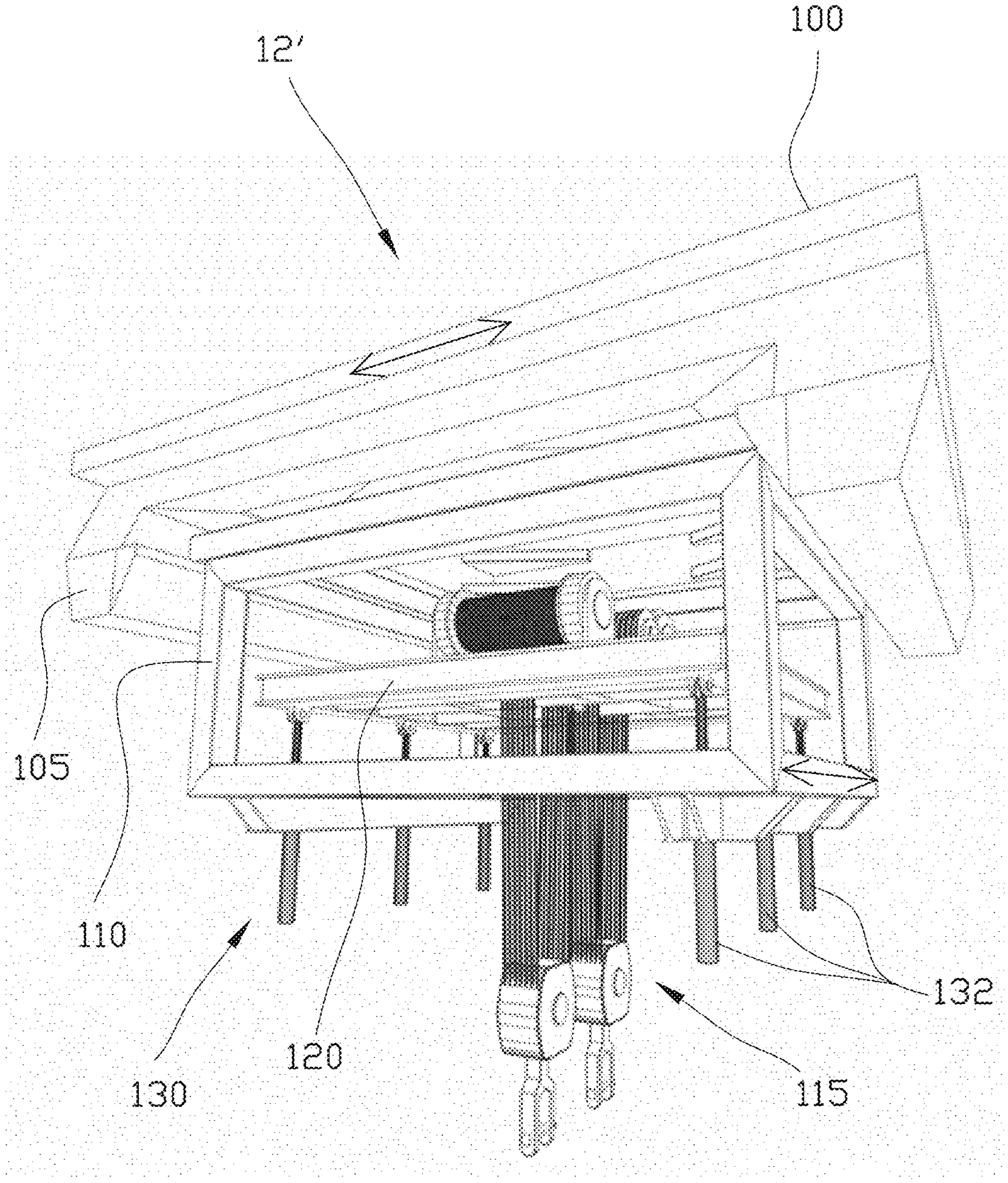
FIGS. 13*a* and 13*b* show in larger scale a hoisting device suitable for use in the device according to the invention.
Figure 13B:
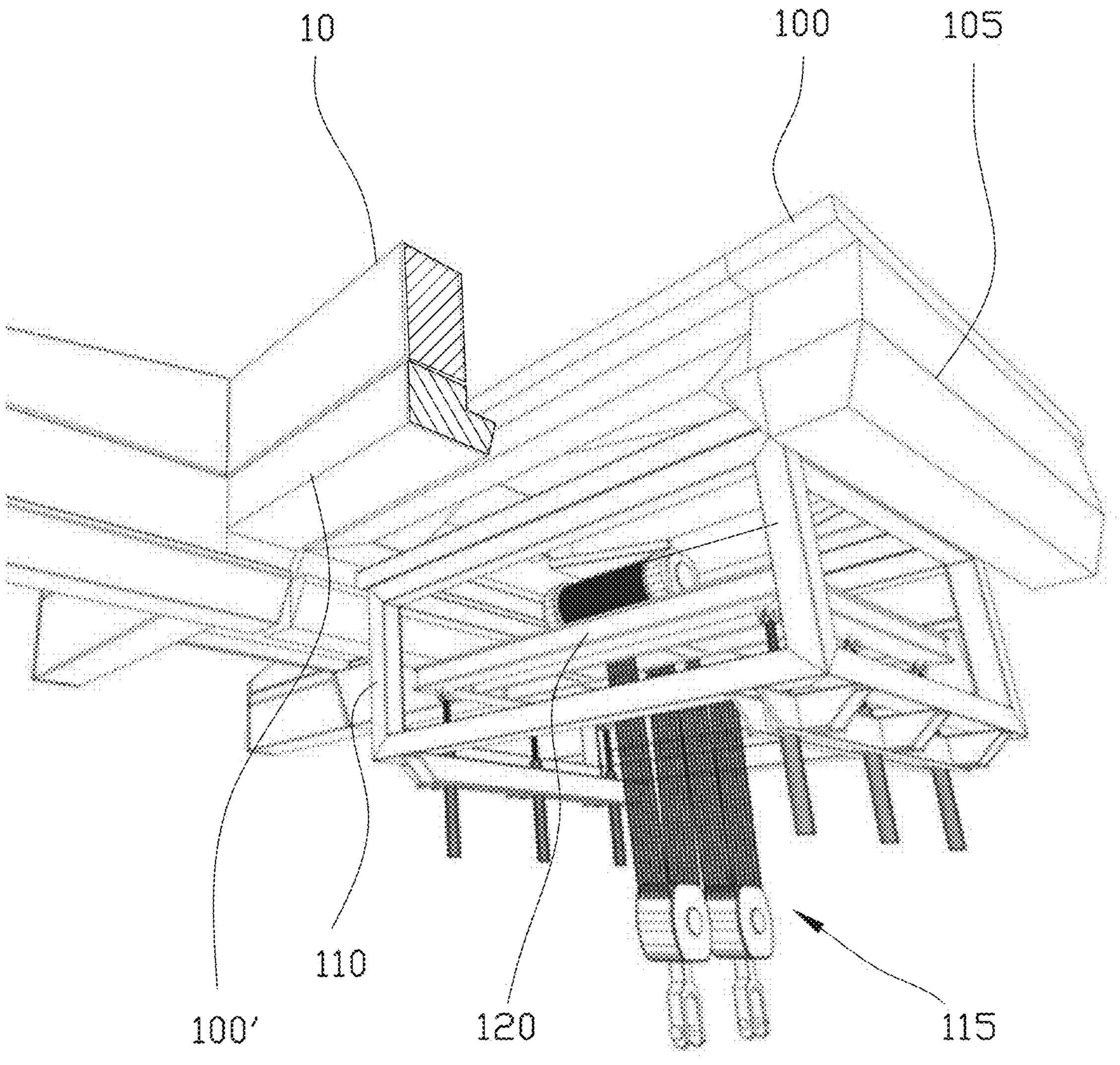

Turning now to FIGS. 13*a* and 13*b* showing a hoisting device 12' that may be a hoisting device 12' in the device 1. The hoisting device 12' comprises an upper skid 100 movable connected to a hoisting device support structure 10 shown in FIG. 13*b*, for example of the type shown in FIG. 1. For illustrative purposes, a portion of the hoisting device support structure 10 has been cut away in FIG. 13*b*.

The hoisting device 12' comprises an upper skid 100 movably connected to a first skid support 100' (see FIG. 13*b*) forming part of the hoisting device support structure 10. The upper skid 100 is movable (as indicated by arrow to the left in the figure) in a first direction in a plane being parallel to the first skid support which is typically in parallel with a base supporting a crane tower, for example the assembling structure 5 shown in FIG. 1. A lower skid 110 is moveably connected to a second skid support 105 forming part of the upper skid 100. The lower skid 110 is movable in a second direction being transverse to said first direction (as indicated by the arrow to the right in the figure). A winch apparatus 115 operatively connected to the lower skid 110.

The winch apparatus 115 is carried by a winch frame 120 operatively connected to the lower skid 110 via a heave compensating apparatus 130 comprising fluid operated pistons 132 (six shown) being individually operable by means of a control system comprising among others sensors for monitoring the weight of the load hanging in the winch apparatus as well as sensors monitoring (i) the position of the load within the assembling structure, (ii) the position of the actuators and, in the event of active compensation, (iii) the position of the load in relation to the body which the load is being lifted onto (or off). Thus, in operation, the heave compensating apparatus may provide a winch frame that "floats" with respect to lower skid 110. The fluid operated pistons will compensate for movements of the rig 1 in relation to the body which the load is being lifted onto (or off).

Figure 14A:
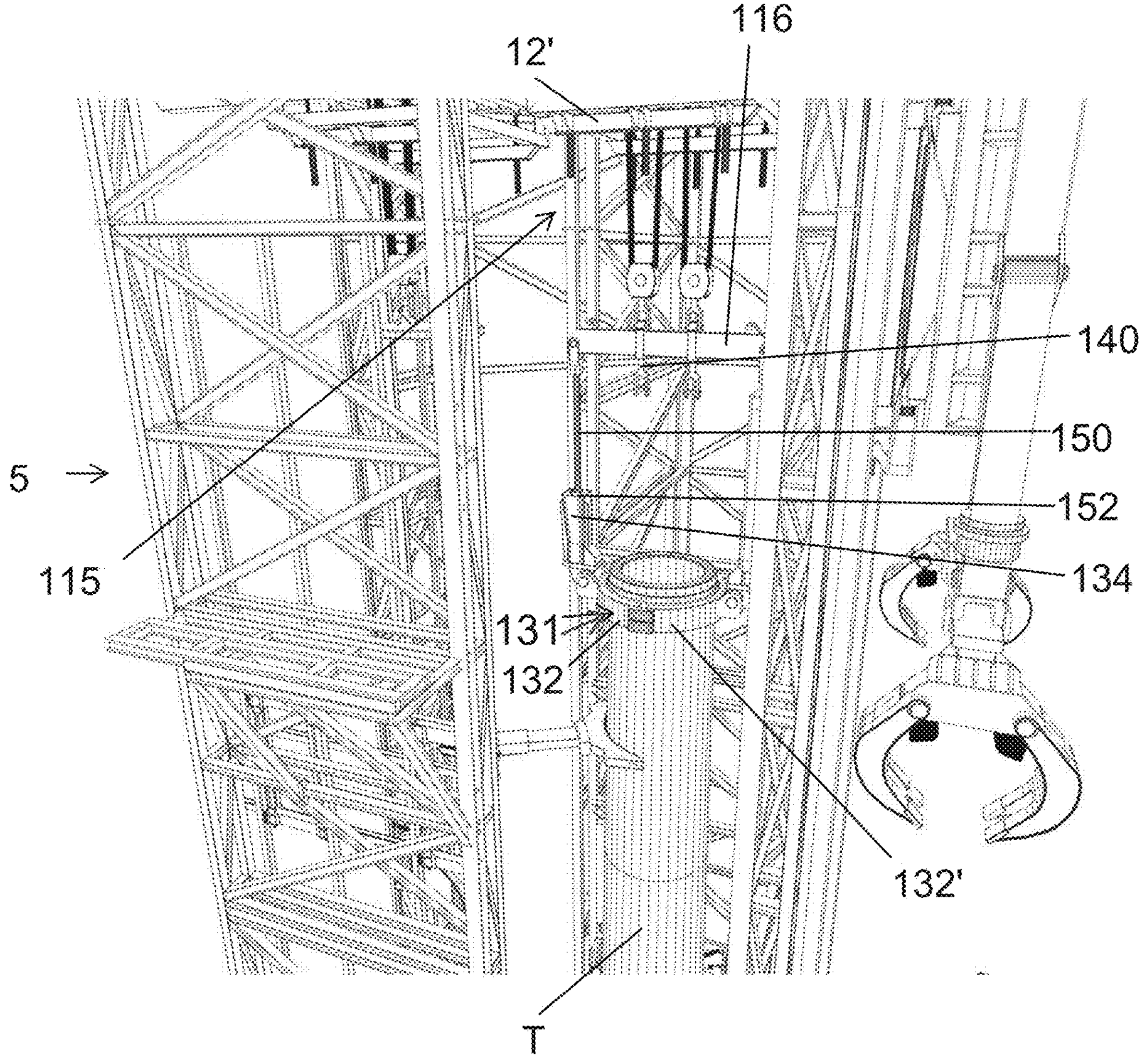
FIG. 14*a* shows in larger scale a detail of the device, wherein the winch apparatus comprises a spreader provided with arms releasably connected to a tower clamp clamping around a portion of the tower, and connectors for connecting to the nacelle.
Figure 14B:
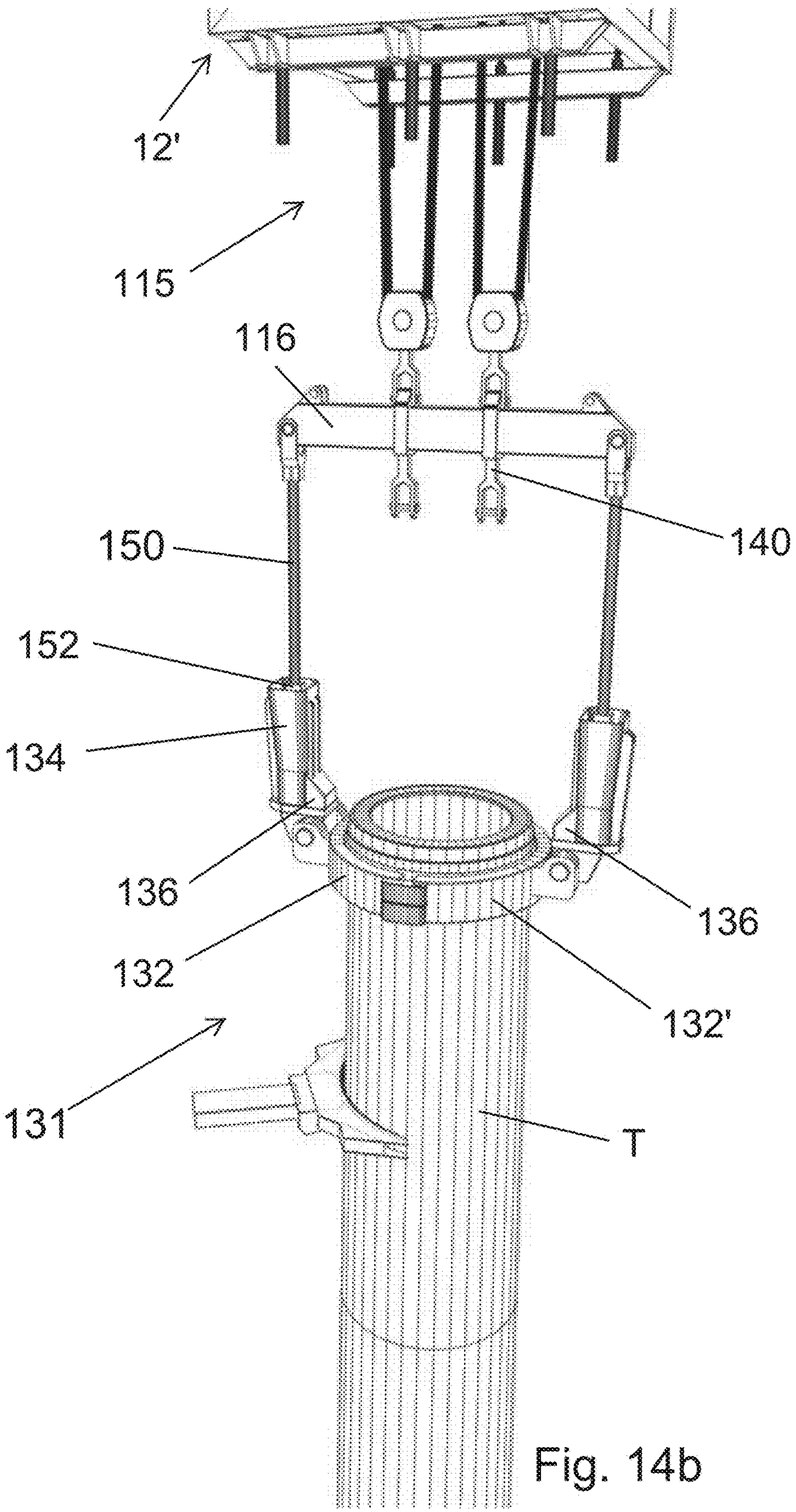
FIGS. 14*b*-14*e* show operational steps of installing the nacelle on top of the wind turbine tower by means of the winch and spreader shown in FIG. 14*a*.

Referring now to FIGS. 14*a* and 14*b* showing in larger scale a detail wherein the wind turbine tower T is arranged within a portion the assembling structure 5, and wherein the tower T is being prepared for receiving the nacelle N.

In the embodiment shown, the winch apparatus 115 of the hoisting device 12' is provided with a spreader 116. At each of its end portions, the spreader 116 is provided with an arm 150 having a first end pivotably connected to the spreader 116, and a second end opposite the first end, the second end provided with arm connectors 152 for being releasably connected to a gripper 131, here in the form of clamp 131 configured for clamping around a portion of the wind turbine tower T. The gripper will hereinafter also be denoted tower clamp 131, or simply clamp 131.

The tower clamp 131 comprises two portions 132, 132' hingedly interconnected and operable between an open, passive position to allow passing onto a portion of the wind turbine tower T, and a closed, active position to enclose or grip around a portion of the wind turbine tower T, as shown. The portions 132, 132' is similar to the guide 75 shown in an open, passive position in FIG. 9. The clamp 131 is configured for being remotely operated in a manner known per se.

FIG. 14*b* shows the same as FIG. 14*a* but wherein the assembling structure 5 of the device 1 according to the invention has been cut-away for clarity.

Prior to use, the clamp 131 is preferably adapted to a diameter of the wind turbine tower T.

Figure 14C:
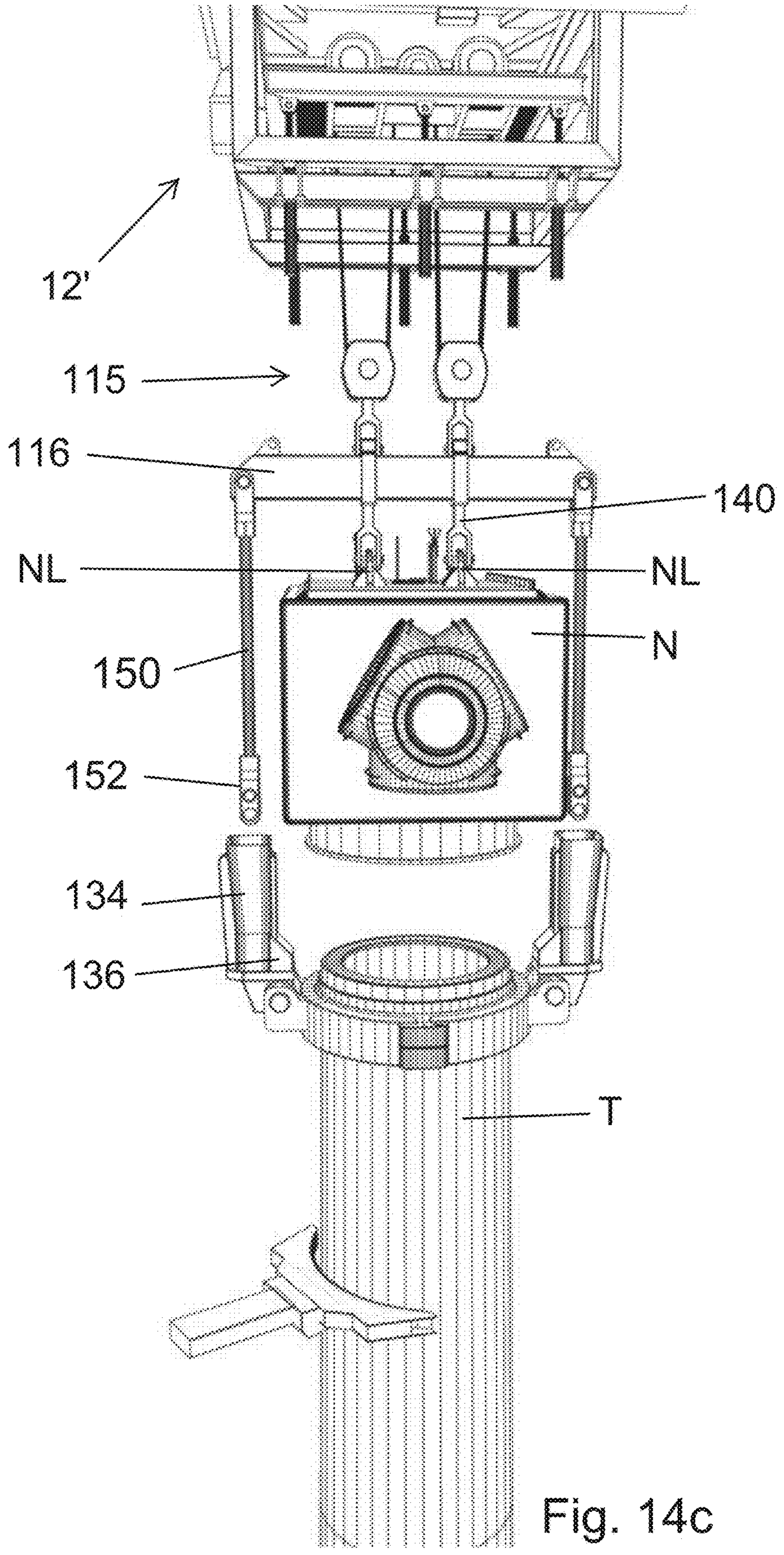

The spreader 116 is further provided with connectors 140 for releasably connecting to lifting lugs NL protruding from an upper face of the nacelle N (see FIG. 14*c*). The pair of connectors 140 is configured for being remotely operated in a manner known per se, for example by means of remotely operated hydraulic or electrical actuators (not shown). In the embodiment shown in FIGS. 14*a*-14*e*, the connectors 140 are connected directly to the spreader 116. However, in an alternative embodiment (not shown) the connectors may be indirectly connected to the spreader via a sub-spreader or lifting yoke extending substantially perpendicular to a longitudinal axis of the spreader 116. Thus, in such an alternative embodiment, the winch apparatus 115 may be connected to a nacelle having lifting lugs arranged lengthwise instead of crosswise as shown in FIGS. 14*c*-14*e*.

The tower clamp 131 is provided with receptacles 134 for receiving and releasably connecting to the arm connectors 152 of the arms 150. The receptacles 134 comprises locking means for engaging the arm connectors 152. The locking means comprises actuators configured for being remotely operated. The actuators may be hydraulically or electrically operated. A hydraulic or electric motor is provided with energy from an on board energy source. The receptacles 134 comprise a controller 136 for operating the locking means. The controller 136 is configured for being wirelessly controlled from a remote location.

Figure 14D:
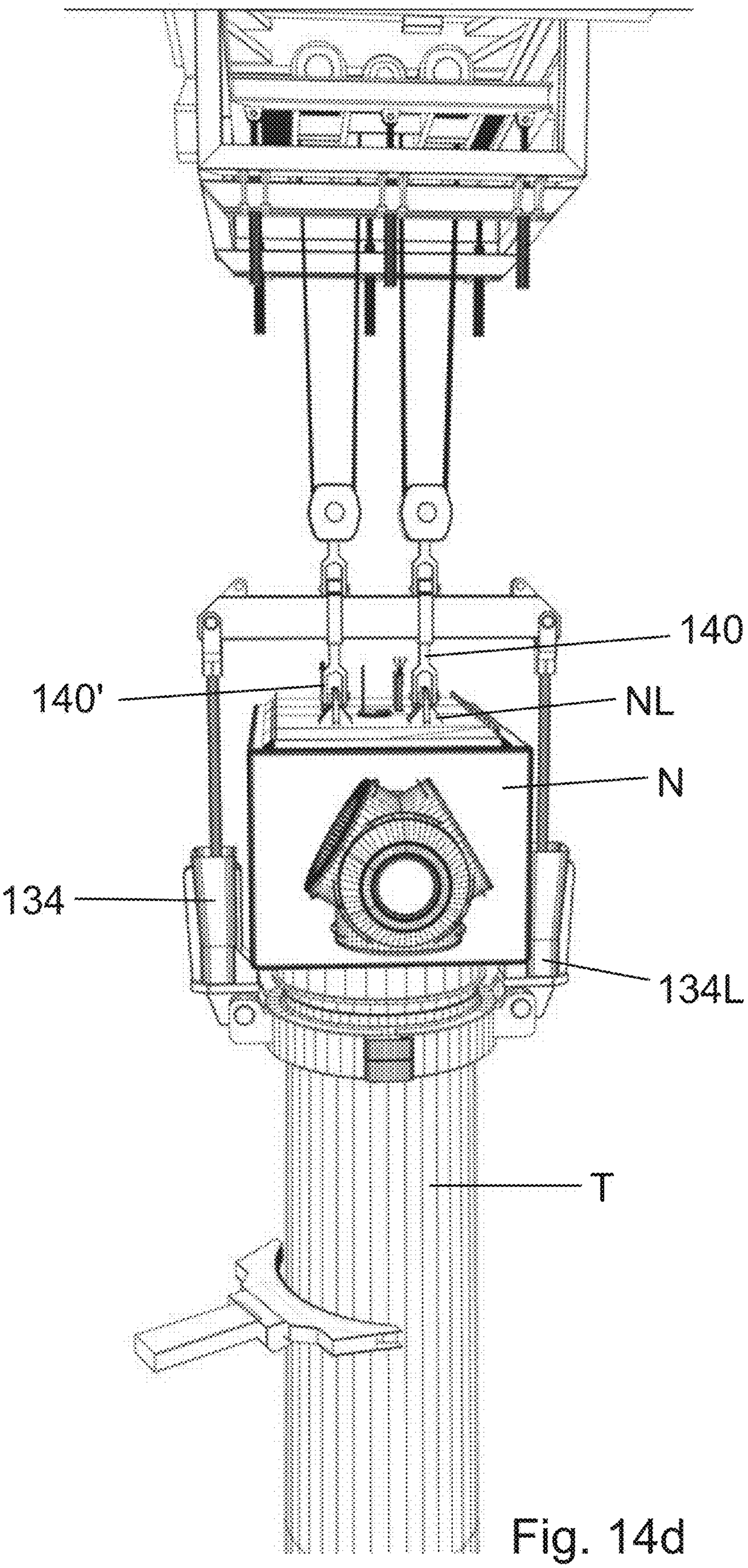
Figure 14E:
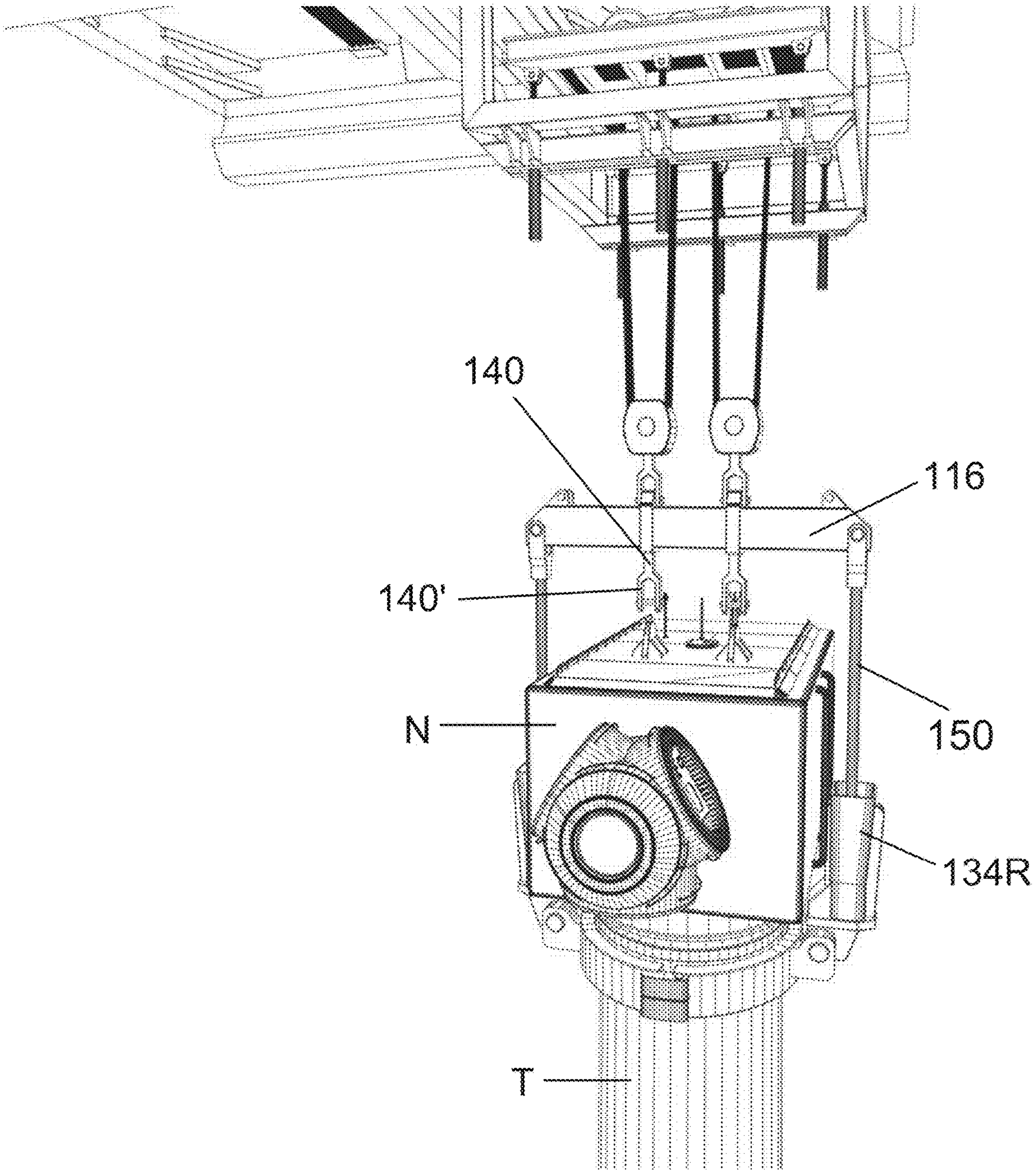

Turning now to FIGS. 14*c*-14*e* which for clarity are, like FIG. 14*b*, illustrated without the appurtenant assembling structure 5.

The spreader 116 is configured so that the arms 150 straddle opposite side portions of the nacelle N to facilitate engagement with the receptacles 134 of the tower clamp 131. Preferably, when the arms 150 are operatively connected to the tower clamp 131, the arms 150 are configured to carry at least the weight of an assembly of the nacelle N and the wind turbine tower T of the wind turbine W. By carrying the weight of the nacelle N and the wind turbine tower T by means of the arms 150 connected to the spreader 116, a total weight of the assembly is carried independently of the nacelle N. Thus, the lifting devices on top of the nacelle N may be designed independently of a weight of the wind turbine tower T.

In FIG. 14*c*, the nacelle N is carried by winch apparatus 115 via the spreader 116 and the connectors 140 of the spreader 116 connected to lifting lugs NL protruding from a top surface of the nacelle N. The operating step shown in FIG. 14*c* is similar to the operating step shown in FIG. 10 wherein the nacelle N is connected directly to the winch apparatus. The arm connectors 152 at the second end portion of the arms 150 are at a distance from the receptacles 134.

In FIG. 14*d*, a lower portion of the nacelle N abuts against a top portion of the wind turbine tower T, so that the weight of the nacelle is carried by the wind turbine tower T. In FIG. 14*c*, the connectors 152 (hidden within the receptacles 134) are arranged at a lower portion of the receptacles 134. The lower portion is indicated by 134L in the figure. The connectors 140 of the spreader are still connected to the lifting lugs NL of the nacelle N.

In FIG. 14*e*, the connectors 140 of the spreader 116 has been released from their engagement with the lifting lugs NL of the nacelle N, and the spreader 116 has been raised with respect to the assembly of the nacellen and the wind turbine tower T. The connectors 152 of the arms 150 are in this position aligned with and in engagement with the locking means of the receptacles 134 being at a raised position indicated by 134R in FIG. 14*e*.

In an alternative embodiment (not shown), at least one of the set of connectors 140 and the set of arms 150 are configured to be axially displaced with respect to the spreader 116. In such an alternative embodiment the locking means may for example be arranged at the lower portion 134L in FIG. 14*d*. An axially displaceable set of connectors 140 and/or set of arms 150 may typically be provided by means of hydraulic cylinders configured for remote operation.

In FIG. 14*e*, the assembly of the wind turbine tower T and the nacelle N is connected to the winch apparatus 115 via the clamp 131, the locking means of the receptacles 134, the arms 150 and the spreader 116, and not via the nacelle N as shown in FIG. 11. As mentioned above, a total weight of the assembly is carried independently of the nacelle N. Thus, the lifting devices on top of the nacelle N may be designed independently of a weight of the wind turbine tower T.

Nacelles N for use in wind turbines WT, will have various designs both with respect to dimensions and for example position of nacelle lifting lugs NL. To facilitate adaption of the spreader 116 and its connectors 140 to such various designs, the connectors 140 are in one embodiment (not shown) configured for being moved along a longitudinal axis of the spreader 116 so that a mutual distance between the connectors 140 may be adjusted. In one embodiment (not shown), a gripping portion 140' of the connectors 140 may be configured for being moved in a direction being perpendicular to the longitudinal axis of the spreader 116.

To facilitate adaption of the spreader 116 and its arms 150 to nacelles N of various dimensions, at least one, but preferably both the arms 150 are in one embodiment configured for being moved along a longitudinal axis of the spreader 116 so that a mutual distance between the arms 150 may be adjusted.

From the disclosure herein it will be understood that operations involving movement of heavy components are done as "grip-to-grip" where a support arrangement operatively connected to the base or to the assembling structure of the device, ensures safe and controlled operations that are substantially independent of weather conditions. Further, embodiments of the invention make possible multiple, independent operations of assembling wind turbines from wind turbine components stored on the device. Thus, the device may provide a manufacturing line.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise», and its conjugations does not exclude the presence of elements or steps other than those stated in a claim. The article "a" or "an" preceding an element does not exclude the presence of a plurality of such elements.

The invention claimed is:

1. A device for facilitating assembling of a wind turbine, the device comprising:

a base extending in an x-y direction;

an assembling structure comprising side portions, the assembling structure extending upward in a z-direction from said base, wherein the assembling structure comprises:

a space for assembling a tower and a nacelle of a wind turbine, the space being defined within the side portions of the assembling structure, a tower passage for passing an upright wind turbine tower into said space, a nacelle passage for passing a nacelle into said space, and a further passage for passing the upright wind turbine tower and the nacelle out from said space once assembled together, the tower passage, the nacelle passage, and the further passage each being defined within the assembling structure, and a hoisting device configured for handling the wind turbine tower and for hoisting the nacelle onto a top of the wind turbine tower while being positioned within said space, the hoisting device being movably connected to a hoisting device support structure provided with protrusions for allowing the hoisting device to operate through at least said tower passage and said further passage, and the hoisting device support structure being arranged on a top portion of the assembling structure, a support arrangement for supporting a portion of the wind turbine at least when being within said space, and a rotor blade manipulator operatively connected to a portion of the assembling structure, the rotor blade manipulator being configured for bringing a root of a rotor blade in contact with a hub of the nacelle, wherein the hoisting device further comprises:

an upper skid movably connected to a first skid support forming part of the hoisting device support structure, the upper skid movable in a first direction in a plane being parallel to the base, a lower skid moveably connected to a second skid support forming part of the upper skid, the lower skid movable in a second direction in a plane being parallel to a deck, the second direction being transverse to said first direction, and a winch apparatus operatively connected to the lower skid.

2. The device according to claim 1, wherein the support arrangement comprises a carriage movable along a track and configured for guiding and supporting a lower end portion of the wind turbine tower.

3. The device according to claim 2, wherein the support arrangement further comprises gripping means for engaging a portion of the wind turbine tower, the gripping means being operatively connected to the assembling structure.

4. The device according to claim 3, wherein the gripping means comprises a gripping means movably connected to the assembling structure via a guideway.

5. The device according to claim 1, wherein the support arrangement further comprises a receptacle extending downwardly from an aperture in the base.

6. The device according to claim 1, wherein the winch apparatus comprises a spreader provided with:

arms for releasably connecting to a gripper configured for gripping a portion of the upright wind turbine tower, and connectors for connecting to the nacelle.

7. The device according to claim 6, wherein the winch apparatus is carried by a winch frame being operatively connected to the lower skid via a heave compensating apparatus.

8. The device according to claim 1, wherein the winch apparatus is carried by a winch frame being operatively connected to the lower skid via a heave compensating apparatus.

9. The device according to claim 8, wherein the heave compensating apparatus is operatively connected to the lower skid by actuators being individually operable.

10. The device according to claim 1, wherein the hoisting device comprises two hoisting devices configured for being operated independently of each other.

11. The device according to claim 1, wherein the tower passage is provided in a first side portion of the assembling structure for passing a wind turbine tower into the space, and the further passage is provided in a second side portion of the assembling structure for passing an assembly of the wind turbine tower and a nacelle to a rotor blade assembly position at an outside of the assembling structure.

12. The device according to claim 11, wherein the assembling structure further comprises a passage in a fourth side portion of the assembling structure, the passage configured for passage of an upright wind turbine tower that has been passed through the first passage, to a temporary storage area.

13. The device according to claim 1, wherein the base is a deck on top of a hull of a floating vessel.

14. A method for facilitating assembling of a wind turbine, wherein the method comprises:

providing the device according to claim 1;

connecting the hoisting device to a top portion of the wind turbine tower and bringing the wind turbine tower into the space of the assembling structure;

supporting a lower portion of the wind turbine tower by the support arrangement;

disconnecting the hoisting device from the top portion of the wind turbine tower, connecting the hoisting device to the nacelle of the wind turbine, hoisting the nacelle on top of the wind turbine tower, and assembling the nacelle thereto;

hoisting, with the hoisting device, the assembly of the wind turbine tower and the nacelle to a rotor blade assembly position on an outside of the assembling structure; and bringing, via the rotor blade manipulator, rotor blades from a rotor blade storage area into contact with the hub of the nacelle, and securing the rotor blades thereto.

15. The method according to claim 14, wherein the method further comprises passing at least two wind turbine towers into the space and storing at least one of the at least two wind turbine towers in an upright position in a temporary storage area on the device, while assembling the nacelle to one of the at least two wind turbine towers.

16. The method according to claim 15, wherein the method comprises providing the hoisting device support structure with two hoisting devices configured for being operated independently of each other and using one of the hoisting devices to pass one or more wind turbine towers to the temporary storage area while another one of the hoisting devices is used for assembling a nacelle to a wind turbine tower.

17. The method according to claim 14, wherein the method further comprises supporting the wind turbine sideways by means of guides when being in the rotor blade assembly position, wherein at least one of the guides are movably connected to a side portion of the assembling structure, and lowering the wind turbine into contact with a wind turbine foundation, and disconnecting the wind turbine from the device.

18. The method according to claim 17, wherein the wind turbine is lowered into contact with a wind turbine foundation by means of the hoisting device operatively connected to the nacelle of the wind turbine.

19. The method according to claim 17, wherein the wind turbine is lowered into contact with a wind turbine foundation by means of the hoisting device operatively connected to a portion of the upright wind turbine tower of the wind turbine.

* * * * *